United States Patent
Drumheller

(10) Patent No.: US 7,647,211 B2
(45) Date of Patent: Jan. 12, 2010

(54) CONSTRAINT-BASED METHOD OF DESIGNING A ROUTE FOR A TRANSPORT ELEMENT

(75) Inventor: Michael Drumheller, Seattle, WA (US)

(73) Assignee: The Boeing Company, Chicago, IL (US)

( * ) Notice: Subject to any disclaimer, the term of this patent is extended or adjusted under 35 U.S.C. 154(b) by 622 days.

(21) Appl. No.: 11/439,643

(22) Filed: May 24, 2006

(65) Prior Publication Data

US 2006/0212276 A1   Sep. 21, 2006

Related U.S. Application Data

(63) Continuation-in-part of application No. 09/967,784, filed on Sep. 29, 2001, now Pat. No. 7,444,269.

(51) Int. Cl.
    *G06F 17/50* (2006.01)
(52) U.S. Cl. .......................................................... 703/1
(58) Field of Classification Search ................ 703/1, 703/6, 7; 716/2, 16; 122/235.23; 296/146.7; 166/373; 700/28; 181/228; 165/174; 340/854.3; 53/411; 370/255
    See application file for complete search history.

(56) References Cited

U.S. PATENT DOCUMENTS

| 4,615,011 | A | | 9/1986 | Linsker |
| 5,227,983 | A | | 7/1993 | Cox et al. |
| 5,329,464 | A | | 7/1994 | Sumic et al. |
| 5,452,238 | A | | 9/1995 | Kramer et al. |
| 5,517,428 | A | | 5/1996 | Williams |
| 5,659,484 | A | * | 8/1997 | Bennett et al. ............... 716/16 |
| 5,740,341 | A | | 4/1998 | Oota et al. |
| 5,761,674 | A | | 6/1998 | Ito |
| 5,781,430 | A | * | 7/1998 | Tsai ............................ 700/28 |
| 5,901,785 | A | * | 5/1999 | Chiba et al. ................. 165/174 |

(Continued)

FOREIGN PATENT DOCUMENTS

EP    0 696 775  A1    2/1996

(Continued)

OTHER PUBLICATIONS

Quinlan, Sean and Oussama Khatib, Elastic Bands: Connecting Path Planning and Control, Article, Proc. IEE Internat'l Conf. On Robotics and Automation, 1993, 6 pages.

(Continued)

*Primary Examiner*—Paul L Rodriguez
*Assistant Examiner*—Kandasamy Thangavelu
(74) *Attorney, Agent, or Firm*—Alston & Bird LLP

(57) ABSTRACT

An improved method for designing the route of a transport element, such as a tube, is provided. The method preferably designs the route automatically and, by utilizing constraint objects in the design of the route, as opposed to during a post design check, ensures that the resulting route complies with the various constraint objects. In addition, the method of the present invention may establish an overall cost function to evaluate a plurality of feasible routes of the transport element that each comply with the constraint objects such that a preferred or optimal route may be designed. Constraints may be based upon the routing of the transport element in relation to another transport element, an additional constraint, or a relaxed constraint.

45 Claims, 20 Drawing Sheets

U.S. PATENT DOCUMENTS

| | | | | |
|---|---|---|---|---|
| 5,907,134 | A | * | 5/1999 | Nording et al. ............. 181/228 |
| 5,999,714 | A | * | 12/1999 | Conn et al. ..................... 716/2 |
| 6,047,525 | A | * | 4/2000 | Kieras et al. .................. 53/411 |
| 6,189,607 | B1 | * | 2/2001 | Hosoya et al. ............... 165/174 |
| 6,198,906 | B1 | | 3/2001 | Boetje et al. |
| 6,237,545 | B1 | * | 5/2001 | Barnett et al. .......... 122/235.23 |
| 6,404,744 | B1 | * | 6/2002 | Saito .......................... 370/255 |
| 6,543,043 | B1 | | 4/2003 | Wang et al. |
| 6,745,097 | B2 | | 6/2004 | Kusuzono et al. |
| 7,444,269 | B2 | * | 10/2008 | Drumheller .................... 703/1 |
| 2002/0041110 | A1 | * | 4/2002 | Odashima et al. ........ 296/146.7 |
| 2003/0066652 | A1 | * | 4/2003 | Stegemeier et al. ......... 166/373 |
| 2003/0227393 | A1 | * | 12/2003 | Vinegar et al. ........... 340/854.3 |
| 2006/0247902 | A1 | | 11/2006 | Rourke |

FOREIGN PATENT DOCUMENTS

| | | |
|---|---|---|
| EP | 1 130 527 A2 | 9/2001 |

OTHER PUBLICATIONS

Szykman, S and Cagan, J, Synthesis of Optimal Nonorthogonal Routes, *Journal of Mechanical Design*, Sep. 1996, p. 419-424, vol. 118.

Conru, Andrew B. and Cutkosky, Mark R., Computational Support For Interactive Cable Harness Routing And Design, *ASME 1993*, pp. 551-558, DE-vol. 65-1 (Advances in Design Automation—vol. 1), The American Society of Mechanical Engineers, New York, New York, U.S.A.

Yin, Su; Hodges, Peter; Cagan, Jonathan; and Li, Xianren, *Layout of an Automobile Transmission Using Three-Dimensional Shapeable Components*, Sep. 12-15, 1999, pp. 1-9, Proceedings of DETC 99, 1999 ASME Design Engineering Technical Conference, Las Vegas, Nevada, U.S.A.

Hargraves, C.R. and Paris, S.W.; Direct Trajectory Optimization using Nonlinear Programming and Collocation, *J. Guidance*, 1996, pp. 338-342, vol. 10, No. 4, U.S.A.

Betts, John T. and Huffman, William P., Application of Sparse Nonlinear Programming to Trajectory Optimization, J. Guidance, 1990, pp. 198-206, vol. 15, No. 1, U.S.A.

Betts, John T. and Huffman, William P., Path-Constrained Trajectory Optimization Using Sparse Sequential Quadratic Programming, *Journal of Guidance, Control, and Dynamics*, 1993, pp. 58-19, vol. 16, No. 1, Jan.-Feb. 1993, U.S.A.

Betts, John T. and Huffman, William P., *Mesh Refinement in Direct Transcription Methods for Optimal Control, Optimal Control Applications & Methods*, CCC 0143-2087/98/010001-21, 1998, pp. 1-21, © 1998 John Wiley & Sons, Ltd.

Conru, Andrew B., A Genetic Approach to the Cable Harness Routing Problem, *IEEE*, © 1994, pp. 200-205, 0-7803-1988-4/94.

Kobayashi, Yasuhiro; Mitsuta, Tooru; and Wada, Yutaka, A Knowledge Compilation Method Through Conversation of Symbolic Rules and Facts into Functions, *Journal of Information Processing*, 1988, pp. 183-190, vol. 11, No. 3.

Mitsuta, Toru; Kobayashi, Yasuhiro; Wada, Yutaka and Kiguchi, Takashi, *A Knowledge-Based Approach to Routing Problems in Industrial Plant Design*, 1981, 24 pages.

Park, Hisup; Cutkosky, Mark R.; Conru, Andrew B. and Lee, Soo-Hong, An agent-based approach to concurrent cable harness design, *Artificial Intelligence for Engineering Design, Analysis, and Manufacturing* (1994), pp. 45-61, vol. 8, No. 1, U.S.A.

Zhu, David and Latombe, Jean-Claude, Mechanization of Spatial Reasoning for Automatic Pipe Layout Design, *AI EDAM*, 1991, pp. 1-20, 5(1), 0890-0604/91/010001 © 1991 Academic Press Limited.

Jain, D.; Chatterjee, M.; Unemori, A.; and Thangam, N., A Knowledge Based Automatic Pipe Routing System, Computers in Engineering, *ASME* 1992, pp. 127-132, vol. 1.

Satyanarayana, M.V.V., et al., An Automated Pipe-Route Planner in Three Dimensional Plant Layout Design, *IEEE*, 1992, pp. 71-76, 0-8186-2760-3/92.

Gunn, D.J. and Al-Asadi, H.D., Computer-Aided Layout of Chemical Plant: A Computational Method and Case Study, *Computer-Aided Design*, Apr. 3, 1987, 11 pages, vol. 19, No. 3.

*Embassy Revolutionizes Wire Harness Design*, 1997, 1 page, Mechtronix Design Automation, Inc., Westborough, Massachusetts.

Zhu, David and Latombe, Jean-Claude, Pipe Routing—Path Planning (with Many Constraints), Apr. 1991, pp. 1940-1947, *Proceedings of the 1991 IEEE International Conference on Robotics and Automation*, Sacramento, California.

Wangdahl, Glenn E.; Pollack, Stephen M.; and Woodward, John B., *Minimum-Trajectory Pipe Routing, Journal of Ship Research*, Mar. 1974, pp. 46-49, vol. 18, No. 1.

Zhu, David and Latombe, Jean-Claude, *New Heuristic Algorithms for Efficient Hierarchical Path Planning*, Department of Computer Science, Stanford University, Aug. 1989, Report No. STAN-CS-89-1279, Stanford, California.

Bohle, Detlef; Jakobs, Gerhard; Hanisch, Klaus; Kabitz, Harry, Rechnerunterstutzung bei der Rohrleitungs-Konstruktion im 3D-Raum, *Chem.-Ing.-Tech.*, 1982, pp. 241-246, vol. 54, Nr. 3,S., © Verlag Chemie GmbH, D-6940 Weinheim.

Betts, John T. and Cramer, Evin J., Application of Direct transcription to Commercial Aircraft Trajectory Optimization, *Journal of Guidance, Control, and Dynamics*, Jan.-Feb. 1995, pp. 151-158, vol. 18, No. 9, A Publication of the American Institute of Aeronautics and Astronautics, Inc., Washington, DC.

Betts, J.T., Survey of Numerical Methods for Trajectory Optimization, *Journal of Guidance, Control, and Dynamics*, Mar.-Apr. 1998, pp. 193-207, vol. 21, No. 2, A Publication of the American Institute of Aeronautics and Astronautics, Inc., Washington, DC.

Friedman, Jerome H., *Multivariate Adaptive Regression Splines*, Stanford Linear Accelerator Center and Department of Statistics Stanford University Technical Report, Aug. 1990, 157 pages, SLAC PUB-4960 Rev. Tech Report 102 Rev, Stanford, California.

Kavraki, Lydia; Svestka, Petr; Latombe, Jean-Claude, Overmars, Mark H., Probabilistic Roadmaps For Path Planning In High-Dimensional Configuration Spaces, *IEEE Transactions On Robotics And Automation*, Aug. 4, 1996, pp. 566-580, vol. 12, Issue 4.

Hsu, D.; Latombe, J.-C.; Motwani, R., *Path Planning In Expansive Configuration Spaces*, 1997 IEEE International Conference On Proceedings, 1997, pp. 2719-2726, vol. 3.

Wei, Yu-Feng; Thornton, Anna C., *Robust Design For Tube Bending And Assembly*, http://web.mit.edu/yfwei/www/explorat.htm web page, at least by Jun. 30, 2001.

Gill, Philip E.; Murray, Walter; Saunders, Michael A.; Wright, Margaret H., *User's Guide for NPSOL 5.0: A Fortran Package For Nonlinear Programming*, Technical Report SOL 86-1, Jul. 30, 1998.

Wei, Yu-Feng; Thronton, AC.C, *Tube Production And Assembly Systems: The Impact Of Compliance And Variability On Yield*, Proceedings of ASME Design Automation Conference, DETC2000/DAC-14271, Sep. 2000.

Wei, Yu-Feng, *Concurrent Design For Optimal Quality And Cycle Time*, Thesis, Massachusetts Institute of Technology, Feb. 2001.

Betts, John T., Issues In The Direct Transcription Of Optimal Control Problems To Sparse Nonlinear Programs, in Computational Optimal Control, *International Series of Numerical Mathematics*, 1994, pp. 3-18, vol. 115.

Jean-Paul Laumond, Paul E. Jacobs, Michel Taïx and Richard M. Murray, A Motion Planner For Nonholonomic Mobile Robots, *IEEE Transactions On Robotics And Automation*, Oct. 1994, pp. 577-593, vol. 10, No. 5.

C. Hsu, G. Alt, Z. Huang, E. Beier, B. Bruderlin, A Constraint-based Manipulator Toolset for Editing 3D Objects, *Solid Modeling '97*, 1997, pp. 168-180, Atlanta, Georgia.

Tim Alibozek, Smart software builds a better harness, *Machine Design*, May 7, 1998, pp. 89-92.

Terrence Fernando, Norman Murray, Kevin Tan, Prasad Wimalaratne, Software Architecture for a Constraint-based Virtual Environment, *VRST 99*, 1999, pp. 147-154.

Jian Hu, Sachin S. Sapatnekar, *A Timing-constrained Algorithm for Stimultaneous Global Routing of Multiple Nets*, pp. 99-103.

French Search Report, FR 0212023, Dec. 29, 2004.

Drumheller, M., *Constraint-Based Design of Optimal Transport Elements*, Transctions of the ASME, Journal of Computing and Information Science in Engineering, vol. 2, Dec. 2002, pp. 302-311.

Notice of Allowance (7 pages) dated Jul. 1, 2008, for U.S. Appl. No. 09/967,784, filed Sep. 29, 2001 (issued Oct. 28, 2008 as U.S. Patent No. 7,444,269); In re: Drumheller; entitled: *Constraint-Based Method of Designing a Route for a Transport Element*.

Amendment (26 pages) filed Feb. 11, 2008, for U.S. Appl. No. 09/967,784, filed Sep. 29, 2001 (issued Oct. 28, 2008 as U.S. Patent No. 7,444,269); In re: Drumheller; entitled: *Constraint-Based Method of Designing a Route for a Transport Element*.

Non-final Office Action (24 pages) dated Aug. 10, 2007, for U.S. Appl. No. 09/967,784, filed Sep. 29, 2001 (issued Oct. 28, 2008 as U.S. Patent No. 7,444,269); In re: Drumheller; entitled: *Constraint-Based Method of Designing a Route for a Transport Element*.

Amendment (29 pages) filed May 30, 2007, for U.S. Appl. No. 09/967,784, filed Sep. 29, 2001 (issued Oct. 28, 2008 as U.S. Patent No. 7,444,269); In re: Drumheller; entitled: *Constraint-Based Method of Designing a Route for a Transport Element*.

Non-final Office Action (33 pages) dated Nov. 30, 2006, for U.S. Appl. No. 09/967,784, filed Sep. 29, 2001 (issued Oct. 28, 2008 as U.S. Patent No. 7,444,269); In re: Drumheller; entitled: *Constraint-Based Method of Designing a Route for a Transport Element*.

Preliminary Amendment (24 pages) dated Sep. 19, 2006, for U.S. Appl. No. 09/967,784, filed Sep. 29, 2001 (issued Oct. 28, 2008 as U.S. Patent No. 7,444,269); In re: Drumheller; entitled: *Constraint-Based Method of Designing a Route for a Transport Element*.

Reply (24 pages) dated Apr. 19, 2006, for U.S. Appl. No. 09/967,784, filed Sep. 29, 2001 (issued Oct. 28, 2008 as U.S. Patent No. 7,444,269); In re: Drumheller; entitled: *Constraint-Based Method of Designing a Route for a Transport Element*.

Final Office Action (17 pages) dated Oct. 19, 2005, for U.S. Appl. No. 09/967,784, filed Sep. 29, 2001 (issued Oct. 28, 2008 as U.S. Patent No. 7,444,269); In re: Drumheller; entitled: *Constraint-Based Method of Designing a Route for a Transport Element*.

Amendment (19 pages) dated Jul. 25, 2005, for U.S. Appl. No. 09/967,784, filed Sep. 29, 2001 (issued Oct. 28, 2008 as U.S. Patent No. 7,444,269); In re: Drumheller; entitled: *Constraint-Based Method of Designing a Route for a Transport Element*.

Non-final Office Action (11 pages) dated Jan. 25, 2005, for U.S. Appl. No. 09/967,784, filed Sep. 29, 2001 (issued Oct. 28, 2008 as U.S. Patent No. 7,444,269); In re: Drumheller; entitled: *Constraint-Based Method of Designing a Route for a Transport Element*.

* cited by examiner

CONSTRAINT-BASED METHOD OF DESIGNING A ROUTE FOR A TRANSPORT ELEMENT

CROSS-REFERENCE TO RELATED APPLICATION

This application is a continuation-in-part of U.S. patent application Ser. No. 09/967,784, entitled "Constraint-Based Method of Designing a Route For a Transport Element," filed Sep. 29, 2001 now U.S. Pat. No. 7,444,269, the contents of which are incorporated by reference in their entirety.

FIELD OF THE INVENTION

The present invention relates generally to methods for designing a route for a transport element, such as a tube, and, more particularly, to methods for designing a route for a transport element based upon at least one constraint object that limits the possible routes for the transport element and improved methods for routing multiple transport elements and preferably increasing the speed at which transport elements can be designed.

BACKGROUND

Transport elements, such as tubes, cables, hoses, wires, wire bundles, and the like, are widely used in a great variety of applications. For example, a jet airliner contains approximately 3,000 custom-designed metal tubes in a number of different systems including the hydraulic system, pneumatic system, fuel system, drainage system, fire suppression system, and the like. In many of these applications, the tubes must be carefully designed in order to be manufacturable and installable. For example, the design of each tube carried by a jet airliner typically takes about 40 hours on average.

Most conventional systems, such as U.S. Pat. No. 5,227,983 to Cox, relate to the design of piping (in particular networks of piping). Such systems are concerned with automating, or helping to automate, the design of a typically approximate plan for pipes, such as in a building, ship, or factory. Piping, however, is different from the more general class of transport elements (exemplified by bent-metal tubing) that the present invention deals with, for two primary reasons. First, piping characteristically involves assembling pre-manufactured shapes (exemplified by straight sections, 90-degree elbows, 45-degree elbows, etc.) and is laid out in a generally rectilinear fashion, i.e., subsequent sections of pipes usually differ in orientation by 90 degrees or 45 degrees. In contrast, the generic class of transport elements including tubing, hoses, wires, etc. are available in, typically, straight, but sometimes also coiled, stock into which are introduced straight sections of arbitrary (or nearly arbitrary, subject to certain constraints detailed below) lengths and angles of arbitrary (or nearly arbitrary, subject to certain constraints detailed below) degrees.

Another important point of contrast is that piping layout does not generally have to be exact, but can often be approximated within an error on the order of fractions of an inch, inches, or sometimes even feet. There are two senses in which a mere approximation is tolerated: (a) failure to be precise and (b) failure to be optimal. With regard to the first sense in which a mere approximation is tolerated, failure to be precise can also be called coarseness of specification. This means that the output of the design system is not expected, or relied upon, to be correct to within a certain crude tolerance. This does not matter greatly in piping designs because a given piping design is often assembled only once, or at most a few times. This is because buildings, factories, and ships of given design are seldom manufactured in large numbers. Therefore, small errors in the design can be affordably worked-out by the persons of skill installing the pipes, such as by cutting and shaping them to the necessary dimensions in situ. In contrast, products such as airplanes and automobiles are manufactured in the thousands or even millions. Therefore, for reasons of efficiency, it is essential to have a single, exact design that can be manufactured in great numbers off-line, then moved to the point of assembly and integrated into the final product with no further modification.

With regard to the second sense in which a mere approximation is tolerated, failure to be optimal has two main aspects. First, many design domains, especially aircraft, are highly sensitive to weight and other performance measures. For example, it would typically be unacceptable for a large tube on an airliner be one inch longer than necessary, subject to the design constraints. This is because an inch of tubing, especially when filled with fluid, can weigh on the order of ounces. Thus, the thousands of tubes in an airplane, if designed with a sub-optimal system, might weight many tens, or even hundreds, of pounds more than they would had they been designed with an optimal system. Because of the harsh economics of commercial air transport, every ounce is a vital target for elimination, even on a half-million-pound vehicle. Second, each tube in an airplane is typically labored over by a human designer or team of designers for many hours. The designer manipulates the shape of the tube with a computer-aided design (CAD) system that provides an extremely detailed and realistic view of the tubes. Experienced designers possess a highly refined visual intuition about what shape they want to obtain. Simply put, they can tell when things are "off," and they demand total and fine control in rectifying such situations. Accordingly, a conventional system suited to the design of pipes in a building is generally far too crude for designing tubes in such objects as an airplane, a jet engine, or a rocket motor. In sum, conventional systems attempt to design an approximate route or gross route, rather than refining a gross route into an precise, optimal route in the face of various constraints. The gross route is the final output of such systems. The gross route (i.e., approximate route) is in fact only the input to the present invention; the output is something optimal and perfectly manufacturable.

A tube is one type of transport element that poses a number of challenges in its design due to limitations upon the way in which the tube may be bent as described below. By way of background, tubes are generally composed of straight sections joined by circular arcs. As a result of constraints placed upon tube design by the manufacturing process, the straight sections and circular arcs each have a minimum length such that it is impossible to have an arbitrarily small bend, and one bend cannot begin an arbitrarily small distance from another bend. As shown in FIG. 1, a tube generally includes a starting point, designated the A-end, and an ending point, designated the B-end, and at least one bend defined or determined by a node, e.g., $N_1$, therebetween. With respect to the node terminology, it is noted that for certain classes of curves, nodes are also called, e.g., control points. Since the straight segments 2 of a tube are joined by arcuate segments 4, the tube does not pass through the nodes which, instead, are imaginary points where the two adjacent straight sections would intersect if extended far enough as designated by $N_{1\ and\ N2}$ in FIG. 1. A transport element may therefore be defined in terms of its nodes supplemented by some additional information depending upon the type of transport element. In the case of a metal tube, for example, the additional information may include the radius at which the tube is bent at each bend, although typically, for the sake of efficiency, a metal tube is bent at the same radius at each bend. For other types of transport elements, such as hoses, the additional information may be, e.g., the order and knot spacings of a spline. Note that, in the context of splines, such as NURBS, what are herein called "nodes" are often called "control points," "control polygon vertices," or the like. "Node" is merely the prevailing term of art in the tubing business.

While nodes form a compact and intuitive representation of a tube, the use of nodes in the design of tubes may sometimes create problems. For example, a tube design may require a predetermined standoff S at the B-end, such as for tool access, as shown in FIG. 2. In this regard, standoff refers to the length of the straight segment adjacent to either the A-end or the B-end. Traditional design practice is to position the node N a sufficient distance from the B-end to provide the designated standoff. However, if the segment of the tube upstream of node N is modified as shown in FIG. 3, the standoff S' will shrink to an unacceptable level even though the node that defined the standoff was supposedly correct. Nevertheless, even though the node does not define the standoff directly and may therefore be somewhat problematic during the design process, nodes are frequently utilized in the design of tubes because of their simplicity and intuitive appeal.

When designing the route of a transport element, such as a tube, a designer initially develops a gross route, which is an approximate description of a route, or, equivalently, a description of a set of possible routes. The gross route is typically based upon the start and end points as well as various obstacles, way-points, etc. that are located therebetween. In designing the gross route, a designer generally designs it to comply with a number of extrinsic or situation-dependent constraints that include, for example, the minimum separation from structures or other tubes, requirements that the tube be parallel to certain structures, requirements that the tube penetrate certain structures within a particular zone, etc. While termed a "route," the gross route that is designed really defines a whole family of topologically equivalent routes that satisfy the various constraints. Based upon the gross route, a designer can select a specific route for the transport element. Unfortunately, designers cannot generally select the specific route to be optimal for a transport element and currently have no automated techniques for doing so.

Given a gross route, the specific route of a transport element is generally designed by manual drafting in a CAD system such as CATIA. This manual drafting is typically a slow and difficult process. In the case of a metal tube, it may appear that a tube centerline extending from the A-end to the B-end may be easily constructed by merely specifying some intermediate way-points at which the tube will be attached to structures at particular orientations and then having the CAD system fill in straight lines and tangential circular arcs between the A-end, the B-end and the intermediate way-points. The difficulty lies, however, in ensuring—in the face of the difficulties attached to node-based design just described—that the resulting route is manufacturable, satisfies engineering constraints and is optimal.

In the case of metal tubes, for example, the manufacturing process dictates a variety of intrinsic constraints, such as minimum bend angle, maximum bend angle, minimum straight section length between bends, constraint bend radius, etc. These constraints typically arise from the nature of tube bending machines. Generally, a tube bending machine starts with a straight piece of tubing stock and repeatedly performs various operations including shooting out a certain length of tube stock to generate a straight section, bending or wrapping the tube around a circular die to generate a circular arc, and rotating the tube about its longitudinal axis to establish a new plane for the next bend. Typically, it is expensive to change the circular die. As such, each bend in a tube preferably has the same radius. In addition, the machine must be able to grip the stock during the formation of a bend such that the bending head has a certain amount of clearance, i.e., a new bend cannot be started arbitrarily close to the previous bend. The requirement that the tube stock be gripped during bending operations therefore results in the requirement of a minimum straight section length. These constraints are termed "intrinsic" because they are defined without regard to how the tube is situated once it is installed in a machine, plant, or vehicle.

In designing the route for a tube on a CAD system, the designer essentially lays out one straight segment after another or, equivalently, defines one node after another, with the circular arcs connecting these straight sections being interpolated automatically. A variety of CAD systems are available including CATIA, Solid Edge, and Pro/ENGINEER. Typically, these systems offer the designer assistance in placing the next segment by providing an easily manipulated graphical representation of a local Cartesian coordinate system, sometimes called a "compass." In CATIA and similar systems, the designer can place the compass anywhere in the scene, usually by using existing geometry as a base of reference. For example, if the designer wants the next section of a tube to be parallel to a particular facet of a solid, the designer can place the compass on the facet, and indicate which of its three planes is to be "paralleled." The next tubing section is automatically constrained to lie parallel to that plane. Similar functionality is common in many graphical computer applications. The compass is essentially a way of using an inherently 2-D input device (a mouse) as an effective 3-D input device.

The compass can also be used to establish planes that cannot be penetrated during the drawing process. For example, when routing a tube near a piece of machinery from which there must be a certain amount clearance, the designer can use the compass to establish a plane defining an impenetrable barrier at the appropriate distance from the machinery. This barrier behaves like a glass wall through which the cursor cannot move.

Nevertheless, the compass, even with all the operations it provides, only supports what is still an essentially manual, sequential drafting process. As shown in FIGS. 4a-4d, the designer draws one segment of the tube, which is then frozen, and then proceeds to the next section, and so on. With respect to the sequential example provided by FIGS. 4a-4d, the tube design is frozen to the left of the dotted line. As soon as a new segment is drawn, the necessary circular arc is interpolated between the new segment and the previous segment as indicated by the dashed lines in FIGS. 4a-4d. Most CAD systems allow the designer to input minimum bend angles, minimum straight segment lengths and the like and, if the designer draws a tube segment that violates these rules, a warning is provided which may simply involve the failure to construct the tube as requested. However, conventional CAD systems do not provide the designer with any alternative suggestions for a comparable tube segment that would comply with the rules and do not consider any redesign of the previously frozen portion of the tube design. Following completion of a portion of the tube routing, the CAD system simply checks the route for compliance with various rules in a post hoc manner. For example, the CAD system may check the route to ensure that the segment just designed has a certain minimum length. (One example of the CAD system for routing transport elements that offer a mere post hoc check, albeit a rapid and interactive one, is the TubeExpert CAD program provided by Oettinger Gmbh of Oberursel, Germany.) If the post hoc check determines that one or more of the segments does not comply with the rules, the route of the transport element must be redesigned, thereby consuming a significant amount of additional time and resources.

Transport element designs are not always final. Very often it is desirable to modify an existing design. This is another area in which conventional tubing design systems are lacking. Conventional tubing design systems only support a local notion of modification, and one that never includes the automatic insertion, deletion, or re-ordering with respect to background geometry of nodes. For example, consider the tube depicted in FIG. 5. If the nodal point $N_4$ were moved upward, a conventional CAD system would change only that portion of the route of the tube that is just next to the node that is being moved, i.e., the straight segments $N_3$-$N_4$ and $N_4$-$N_5$, and the arcs that connect these straight segments. The remainder of the tube would remain fixed. Thus, conventional CAD systems do not respond in a global way to local influences or changes—even if optimality would demand it. One way of visualizing this is to take the view in FIG. 6, that a tube is essentially a linkage of ball joints and telescoping joints. Under this view, conventional CAD systems "freeze" all the joints but the ones nearest the source of the change. For example, in FIG. 6 as $N_4$ moves upwards, the joints or links that are circled in dashed lines in FIG. 6 are free to accommodate this movement, but the other joints or links are frozen so that the transformation of the route of the tube occurs as shown in FIG. 7. The problem with this is that the optimal (e.g., shortest) redesign is very seldom obtainable by merely local adjustments.

It is noted that the portion of the transport element that drives or originates the modification need not be a single node. For example, the designer may wish to move an entire straight segment, such as the segment between $N_3$ and $N_4$. If this segment were moved upward such as in response to the moving of a clamp through which this segment of the tube must pass, the route of the tube would be varied as shown in FIG. 8 in which the clamp is indicated by a rectangle. It should be noted, however, that the tube still changes shape only via the minimal, local subset of joints or links necessary to allow the upward motion of the $N_3$-$N_4$ segment.

As mentioned above, conventional CAD systems permit tubes to be modified automatically only in a local sense, and only if the modification does not involve the insertion, deletion, or re-ordering with respect to external constraints of nodes. The mathematical object consisting in the number of nodes and where they fall with respect to external constraints (such as hardpoints, obstacles, etc.) is called the node distribution. Put in mathematical terms, conventional CAD systems do not permit one route to be continuously deformed into another unless they have the same node distribution. Put in common CAD terms, tubes with different node distributions cannot be "rubber banded" into one another. In this regard, FIG. 9 depicts the tube extending from a fixed fitting 10 to a bulkhead 12 of an aircraft. If the position of the bulkhead 12 changed as shown in FIG. 10, the node distribution for the tube would also have to change. Crucially, FIGS. 9 and 10 illustrate that the change in the node distribution is not necessarily trivial, even in such an apparently trivial case. That is, even though it might seem that the rotation of the bulkhead could be accommodated by simply introducing one bend, it might actually require up to three bends, even for such a simple situation. (Three bends are needed if a minimum bend-angle constraint is imposed with a sufficiently large minimum bend-angle. If the angle between the bulkheads is less than this threshold, then by definition any configuration having a single bend would violate the constraint, so some number greater than one bend is needed, and in this example it is three. Minimum bend-angle constraints are pervasive in tubing design and are described below.) The key point is that, because FIG. 10 has a different node distribution from FIG. 9, the transition from FIG. 9 to FIG. 10 is not handled automatically by conventional CAD systems. The node distribution is considered inherently "part of the design"-where design means, inherently, the purview and the onus of the human designer. A conventional CAD system would require the designer to foresee the possible future rotation in FIG. 10 and build in the necessary bends into FIG. 9, where clearly they are unnecessary. In sum, the node distribution is not a one-size-fits-all aspect of a route, and even tiny changes in the constraints can impose a radically different node distribution.

The requirement that a human always design the node distribution for a route is a primary deficit of conventional tubing design systems.

By way of another example, a tube may be required to be attached to a structural element 14 as shown in FIG. 11. Most modern parametric CAD systems allow the designer to represent the clamp by associating a mathematical constraint between a point, edge or face of the structural element and an intermediate segment of the tube. Thus, if the structural element were moved downward, the route of the tube may be changed on a local basis as described above and as depicted in FIG. 12. In this regard, some CAD systems also require the designer to specify the joints and links that are free to move. For example, with respect to the route of the tube depicted in FIG. 12, in order to accommodate the downward movement of the structural element, the straight segments 16 of the tube on either side of the structural element may be elongated and the intermediate tube segment 18 may be shrunk, or the intermediate tube segment may maintain a constant length while permitting the straight tube segments on either side to stretch and all four nearby angles 20 to vary. In other words, the CAD system may not necessarily have a predefined rule or principle for determining the joints and links that are free and the joints and links that are frozen and may, instead, require input from the designer.

In contrast to the downward movement of the structural element, upward movement of the structural element can cause the route of the tube to approach an illegal configuration in which the minimum bend angle would be violated at bends 22 as shown in FIG. 13. In this regard, it is important to note that angles α are conventionally measured supplementarily as indicated in FIG. 13. While the upward movement of the structural element may be accommodated either by moving the outboard clamps downward such that the tube may assume a straight line or introducing additional nodes or bends, each of these solutions requires that the tube be (in the eyes of conventional CAD systems) "redesigned" by introducing a different number and general placement of the nodes.

Another important area of transport element CAD is multiple transport elements. Conventional CAD systems do not effectively address the potential for designing the route of a transport element based at least in part upon one or more existing or contemporaneously designed transport elements.

Conventional CAD systems also do not provide solutions for addressing problems such as ambiguities, long transport elements, planarity, and troubleshooting infeasible routes. For an example of an ambiguity, consider a transport element (TE) shaped like a crankshaft (as in a car engine), and assume that the cost function of interest is length. Such a configuration might arise in the case of an expansion loop, which is a crankshaft-shaped deviation in the path needed to make the tube more compliant under stress, such as may be induced by thermal expansion. Such a shape is illustrated in FIG. 29. (Note that a cost function—or objective function-always exists; it is a key aspect of the present invention and is discussed in more detail below.) The length does not change as the crankshaft rotates, i.e., the cost function is indifferent to rotations. Despite the fact that a crankshaft in one rotational position would (at least in some contexts) represent a "different design" from the same crankshaft in another rotational position, conventional CAD systems do not account for determining a rotational position for the crankshaft if the only cost function employed is the cost function of interest related to the length of the crankshaft. As such, the rotational position of the crankshaft is ambiguous using conventional CAD systems, and like ambiguities are not resolved by conventional CAD systems.

SUMMARY OF THE INVENTION

An improved method for designing the route of a transport element, such as a tube, is provided. The method preferably designs the route automatically and, by utilizing constraints during the design of the route, as opposed to during a post-design check, ensures that the resulting route complies with the various constraints. In addition, the method of the present invention establishes a cost function to evaluate a plurality of feasible routes of the transport element that each comply with the constraints such that a preferred or optimal route may be designed.

The present invention provides a general technique for selecting a specific route to be optimal by assigning a cost function or cost functions to the various possibilities embodied in the gross route, and exactly minimizing that cost function(s) subject to pertinent constraints. Not only can the present invention design a node distribution automatically, but the present invention does so in an optimal way, and in a way that is "driven by" the constraints. That is, the system automatically comes up with designs that have no constraint violations by construction, rather than merely helping the designer to draw designs and then merely bringing constraint violations to the designer's attention. This change, from merely checking constraints on an already completed or partially completed design, to using the constraints to drive the design so it meets the constraints before the design is even presented to the user, is a particularly noteworthy improvement for tubing design. Accordingly, the present invention provides a method for automatically determining an optimal node distribution for a transport element and optimal route given that node distribution.

The term "constraint" refers to a rule that some function of the independent variables cannot exceed a certain threshold or must equal a given value. The terms "cost function" and "costs" refer to a function of the independent variables that is to be minimized by some algorithm. Constraint objects and cost functions are described more fully below, including the concept of multiple cost functions.

According to an embodiment of the present invention, the route for a transport element may be designed by establishing at least one constraint that limits possible routes for the transport element, which involves establishing at least one constraint object or cost function and automatically defining the route so as to satisfy the constraints and/or minimize the cost function.

Some constraints and costs may be discrete, meaning they apply to quantities that are integers. For example, an important factor in designing the route for a transport element may be the number of bends occurring between any two targets. (The concept of a target is described in more detail below, and may generally be considered to be a "way point" for a route.) Accordingly, an exemplary embodiment of the present invention for designing a route for a transport element may include a discrete cost function related to the number of bends, and it may be desirable to minimize this cost because, under certain circumstances, the cost might serve as a convenient indicator of flow resistance. As such, an embodiment of the present invention for designing a route for a transport element may include as a constraint the establishment of at least an upper or a lower number-of-bends limit (i.e., a constraint on the number of bends between targets) to assist in the determination of the node distribution for the route, which is used to constrain how many bends should be between adjacent targets. A common mode of usage is where the upper and lower number-of-bends limits are "borrowed" from the route for a similar existing transport element.

Another method which may be used by an embodiment of the present invention for designing a route for a transport element may be partitioning a possible route for a long transport element into segments, i.e., creating sub-problems having very small individual computational burdens, and "stitching together" the solutions of these sub-problems into a solution of the overall problem. The sum of the computational burdens of the sub-problems and the computational burden of the stitching-together process may be much less than the computational burden of the overall problem.

A cost function which may be used by an embodiment of the present invention for designing a route for a transport element is a simulation-of-gravity cost to resolve ambiguities.

Another cost function which may be used by an embodiment of the present invention for designing a route for a transport element may be a so-called segment-length regularizer. This cost may also be used to resolve what may otherwise be ambiguities in the design of the route.

An additional constraint which may be used by an embodiment of the present invention for designing a route for a transport element is a planarity constraint for at least a portion of the route for the transport element.

A sequence of spherical stay-out zones at each of the nodes of a route, also referred to as a sphere set or a spherical stay-out zone set, may be used as a constraint by an embodiment of the present invention for designing a route for a second (contemporaneous or subsequent) transport element in relation to a first (contemporaneous or existing) transport element. Spherical stay-out zones can be treated with efficient calculations, and a sequence of spherical stay-out zones can provide a sufficiently accurate approximation to many important shapes.

Additional constraints which may be used by an embodiment of the present invention for designing a route for a transport element include a parallel routing sleeve and a parallel routing sleeve with another associated constraint or cost function, such as an associated stay-away zone. A parallel routing sleeve refers to a sleeve surrounding a portion of the route for a first transport element which is used in relation to routing a second transport element.

Another constraint which may be used by an embodiment of the present invention for designing a route for a transport element is a routing gutter, i.e., a stay-in (or stay-out) zone associated with a first transport element which is used in relation to routing a second transport element.

Yet another method which may be used by an embodiment of the present invention for designing a route for a transport element is bundle routing, by which multiple transport elements are routed either sequentially or simultaneously, as described further herein.

According to yet another embodiment of the present invention, the route for a transport element is designed by establishing a set of constraints on the route of the transport element, but finding that the constraints admit no solution, i.e., unsuccessfully attempting to automatically define the route for the transport element in accordance with the constraints, thereby determining that a route satisfying the constraints is impossible to obtain. This is a problem because (a) it happens in practice, and (b) when it does happen, it is fundamentally difficult to determine—or even define the concept of—which constraint is "at fault." To address this infeasible route problem, an embodiment of a method for designing a route for a transport element of the present invention relaxes (i.e., converts or replaces) at least one of the constraints into a cost function and automatically defines the route for the transport element in accordance with the new set of cost functions. In mathematical terms, the problem would be converted to an unconstrained problem. Unconstrained problems by definition always have a solution. The problem would then be re-solved. High values of cost functions that stood where constraints previously stood would serve as indications of which constraints were previously "at fault." Such costs could be displayed graphically, e.g., certain parts of the tube (such as bends, or regions too close to stay-out zones, etc.) might be "highlighted" or "lit up." Alternatively, if the user had reason to suspect that a particular subset of the constraints were involved, he or she could relax just those constraints into costs. The method may provide an indication for the route of the variance between previous limits imposed by the constraints and the final values of the corresponding functions when the constraints are not imposed but merely replaced by cost functions. This can help the designer to arrive at a feasible routing solution by suggesting which constraints need to have their limits changed, or which constraints need to be removed altogether. Therefore, the various embodiments of the method of the present invention permit the route of a transport element to be automatically defined in accordance with one or more constraints. As such, the constraints are taken into account during the design of the entire route since they drive the design rather than merely serving as post hoc checks, the failure of which would require the route to be redesigned. Additionally, the method for designing the route of a transport element establishes a cost function to permit the route that is automatically defined to be optimized pursuant to the cost function. By establishing different types of cost function (e.g., by adjusting the weights in the weighted-sum-of-members kind of cost function described below), different routes may be defined based upon the requirements of a particular application.

Additional embodiments of the present invention further improve the method by permitting relationships to be established between two or more of the constraints or cost functions. For example, the angle at which a transport element penetrates a given piece of background structure at a given location might be constrained to have a certain relationship (e.g., equality) to the angle at which the same transport elements penetrates a different piece of structure at a different location. Regarding this conceptual example, it is critical to notice that this can be done without specifying the penetration angle per se at any location, and it is only the relationship between dependent variables which matters. Note that multiple constraint objects that are "linked" in such a way by a constraint relationship are not fundamentally different from just a larger, more complicated kind of constraint. Nevertheless, in practice it is convenient and intuitive to give constraint relationships a separate status.

Additionally, the route of the transport element may be based upon and proximate to an existing (actual) transport element or a route for another transport element, if desired. The method may also provide a technique for routing multiple transport elements simultaneously, as in a bundle or ensemble, by establishing constraints between the multiple transport elements as well as possibly introducing cost functions based in part on the relative configuration of the transport elements.

While the method is advantageous for designing the route of tubes, the method may also be utilized to design the route of other transport elements including cables, hoses, wires, wire bundles and the like.

BRIEF DESCRIPTION OF THE DRAWINGS

Figure 1:
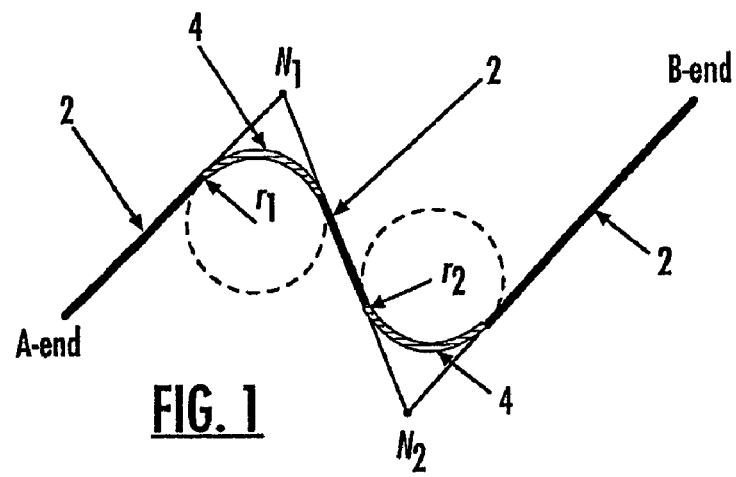
Figure 2:
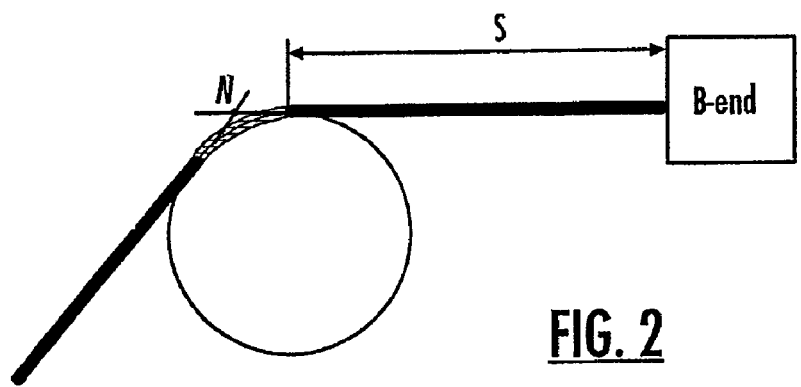
Figure 3:
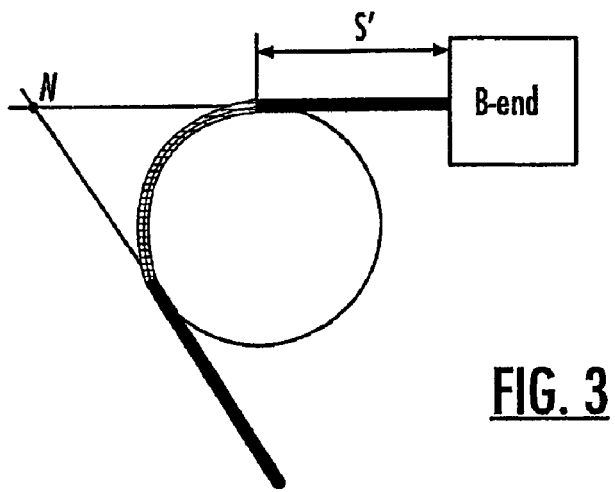
Figure 4A:
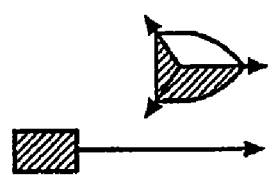
Figure 4B:
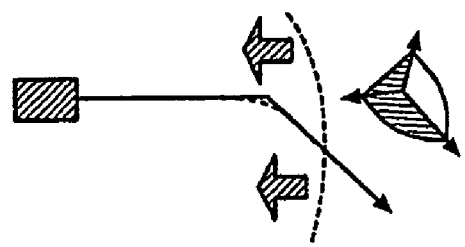
Figure 4C:
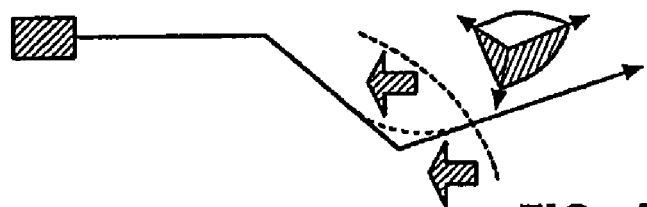
Figure 4D:
Figure 5:
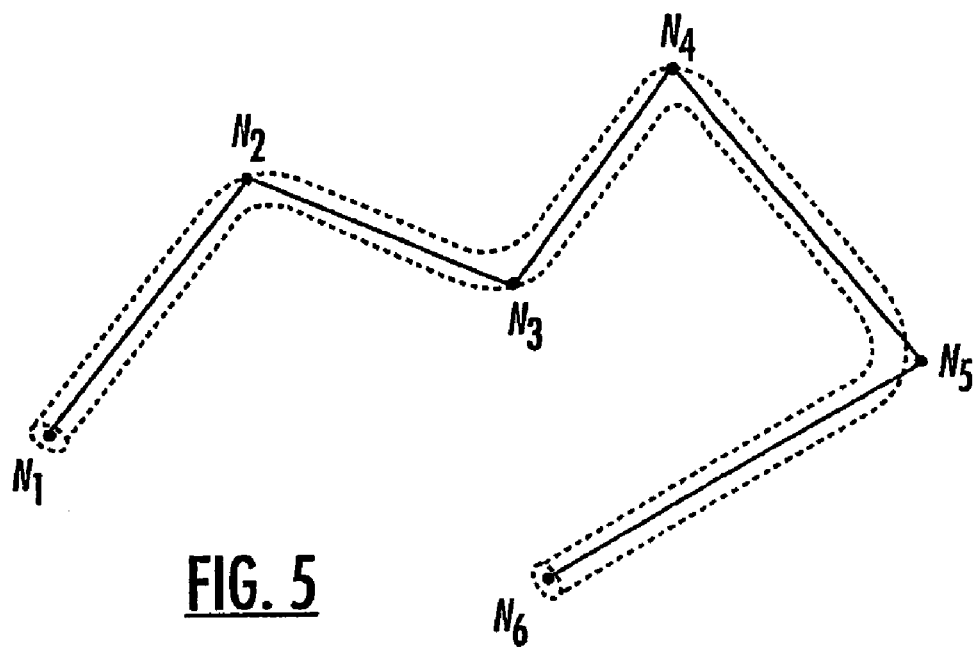
Figure 6:
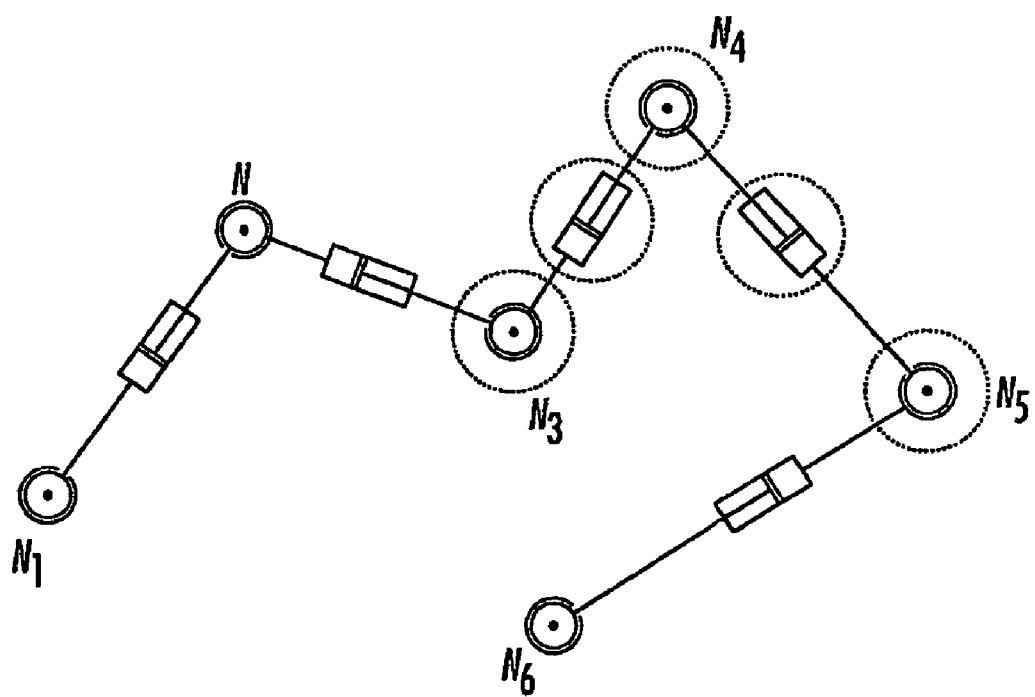
Figure 7:
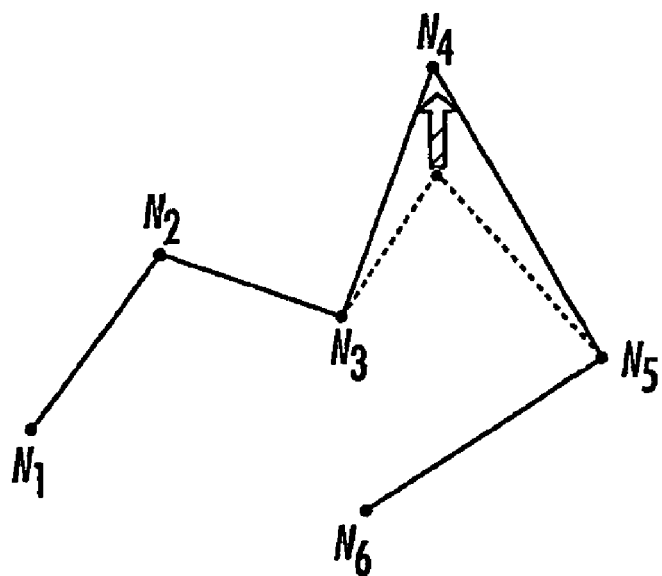
Figure 8:
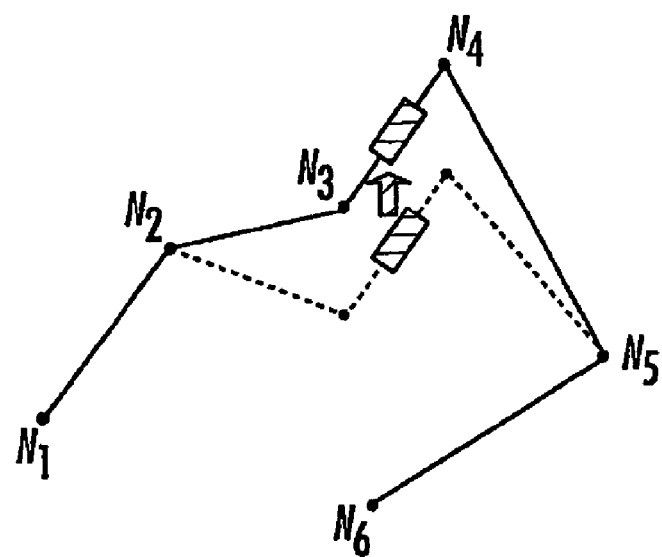
Figure 9:
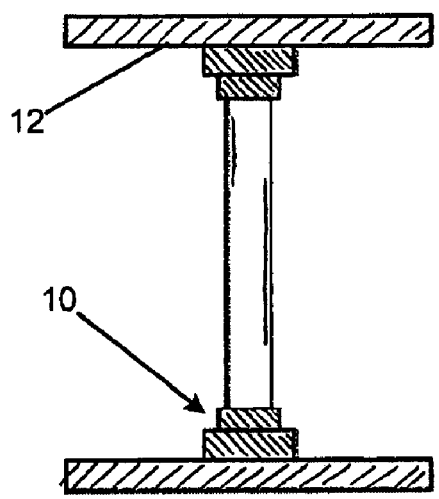
Figure 10:
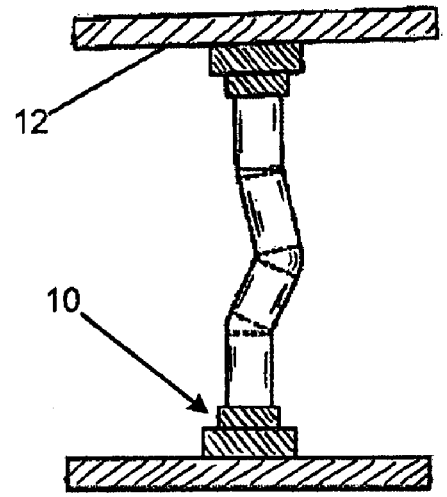
Figure 11:
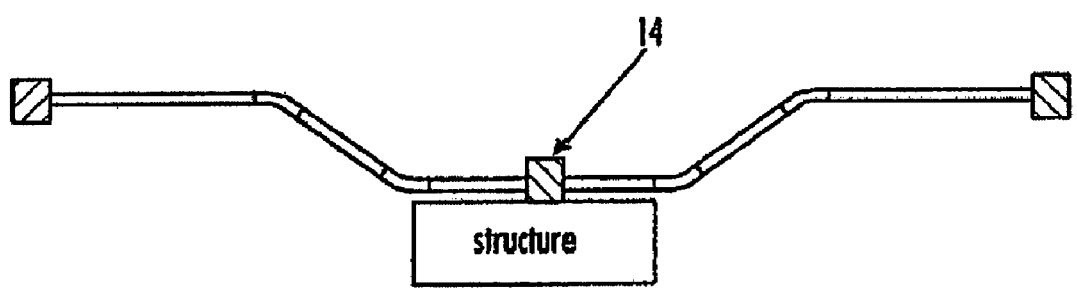
Figure 12:
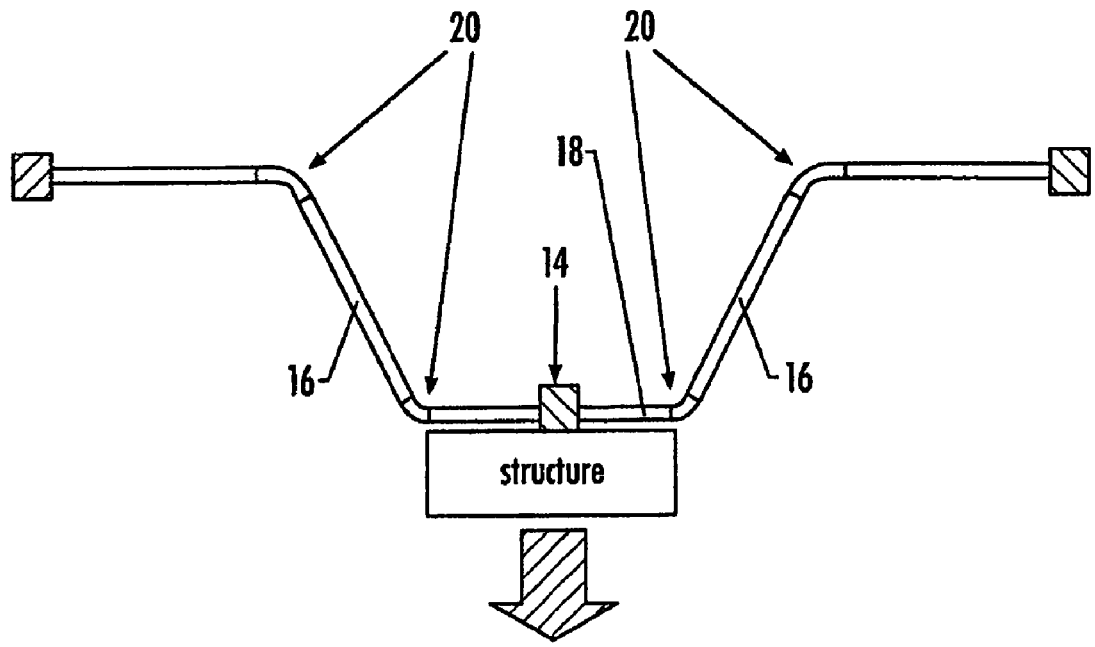
Figure 13:
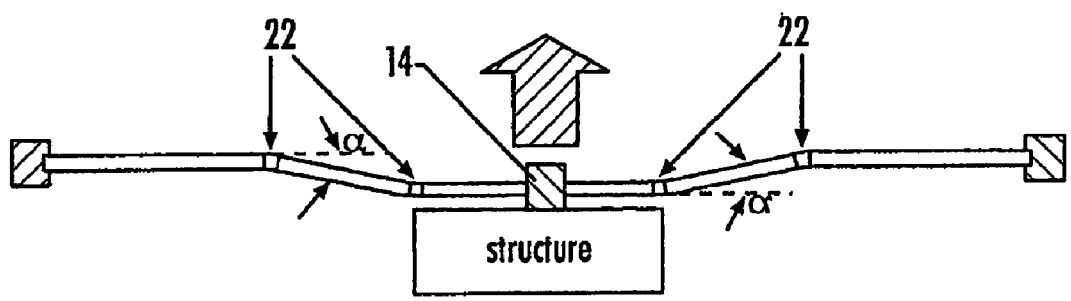
Figure 15:
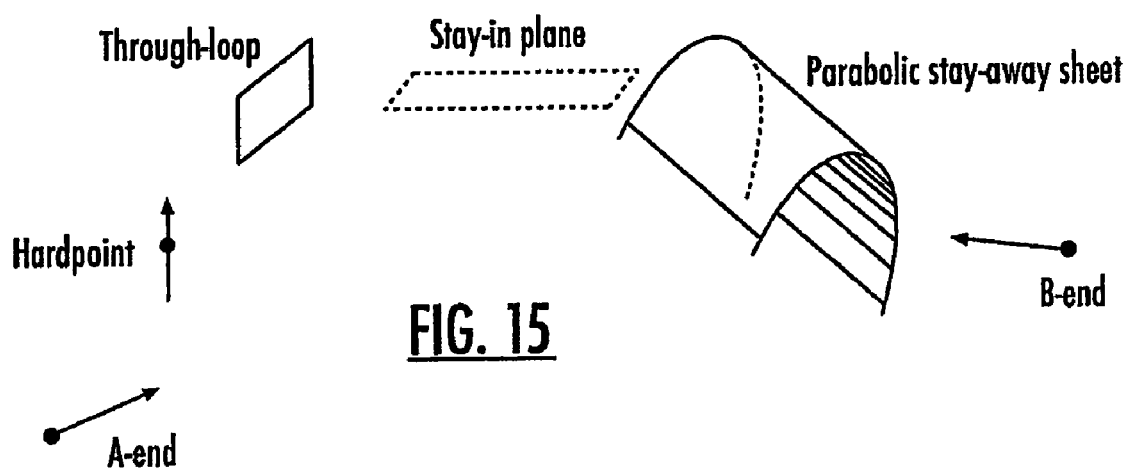
Figure 16:
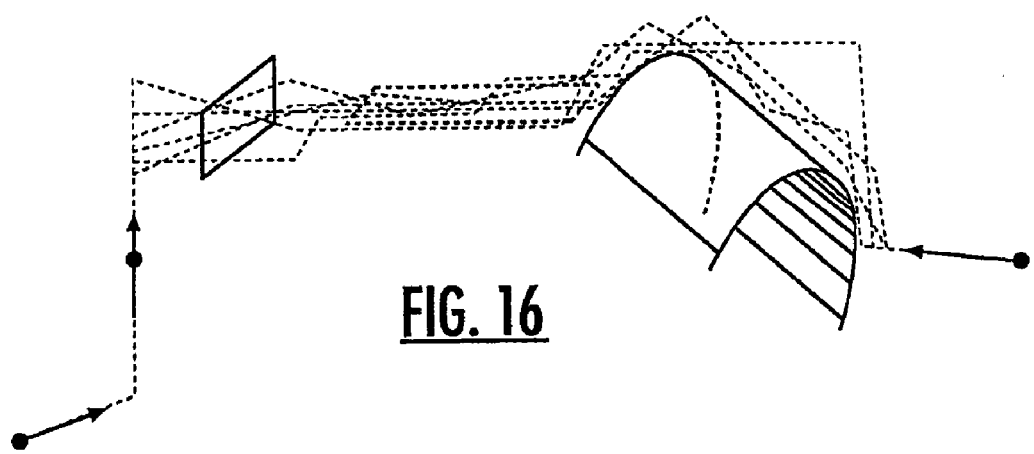
Figure 17:
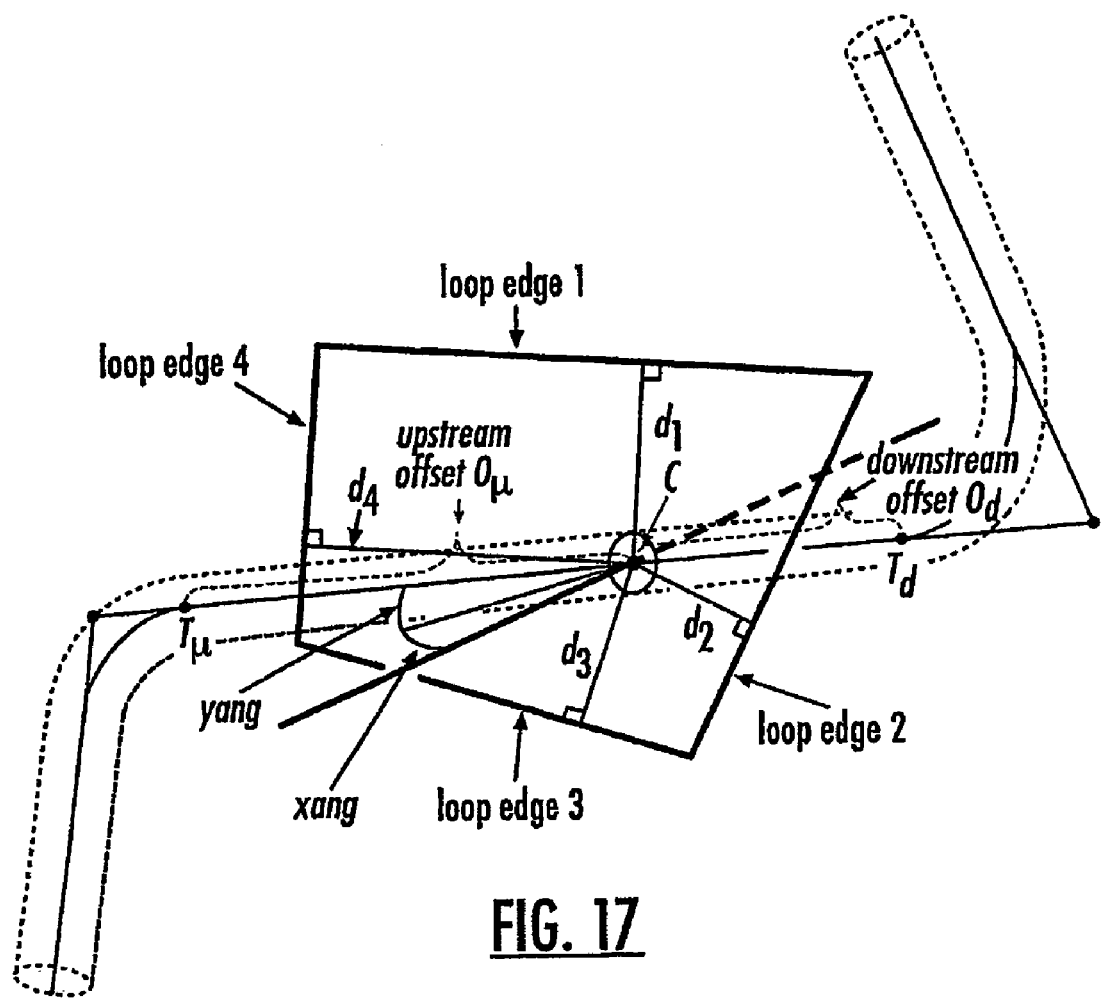
Figure 18:
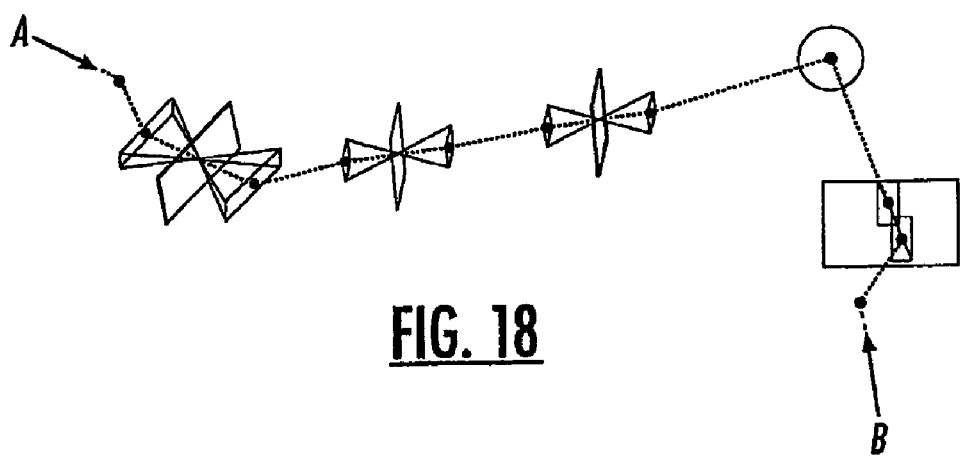
Figure 19:
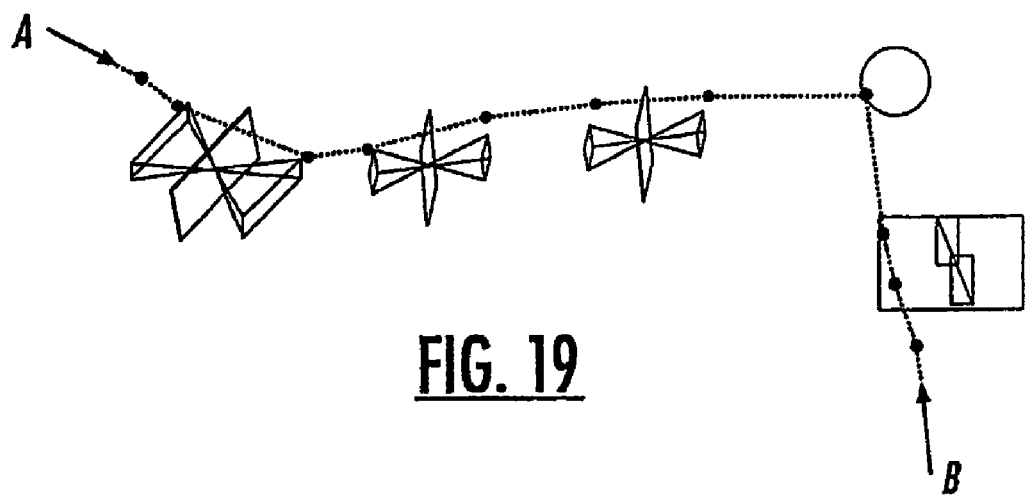
Figure 20:
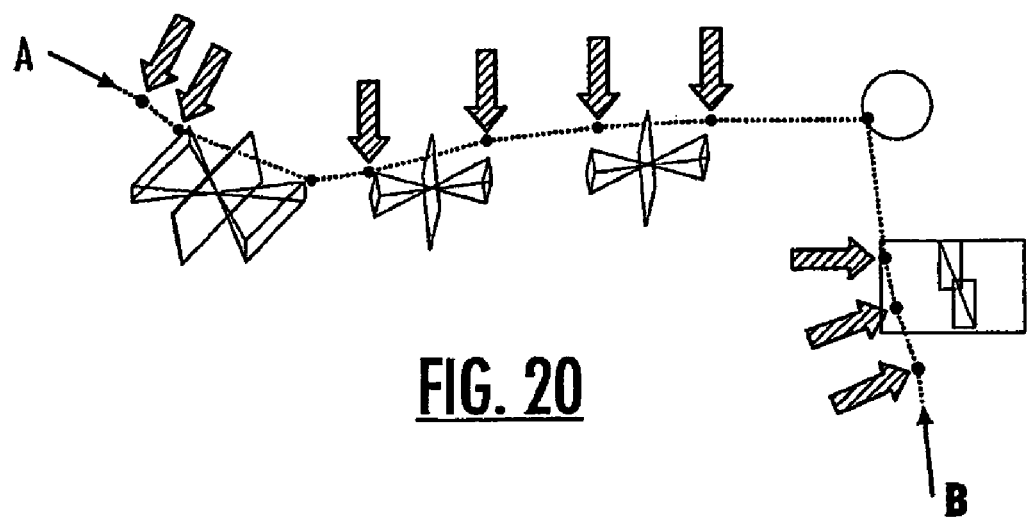
Figure 21:
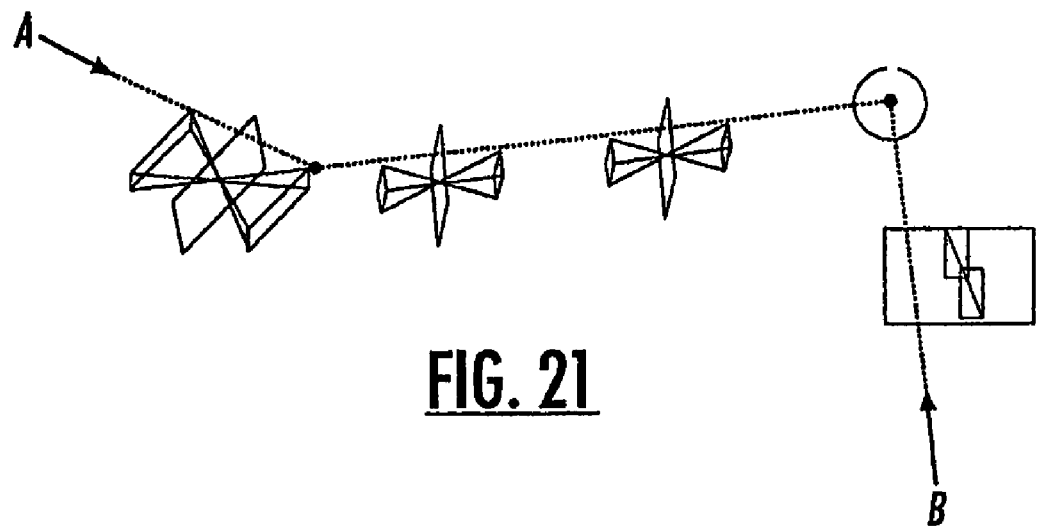
Figure 22:
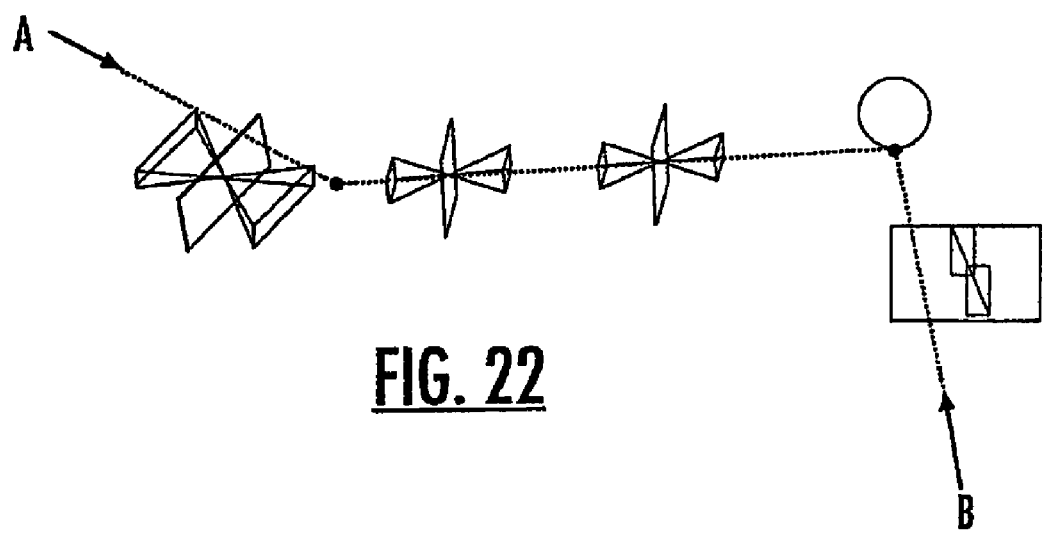
Figure 23:
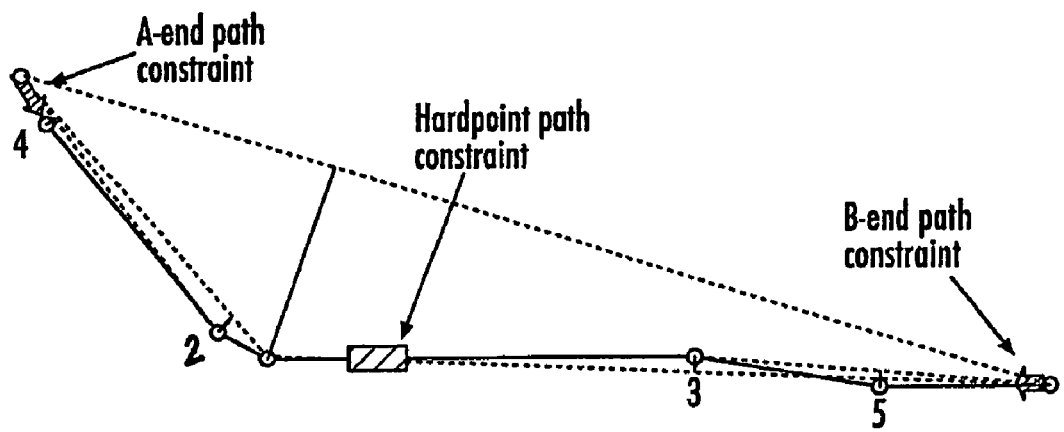
Figure 24:
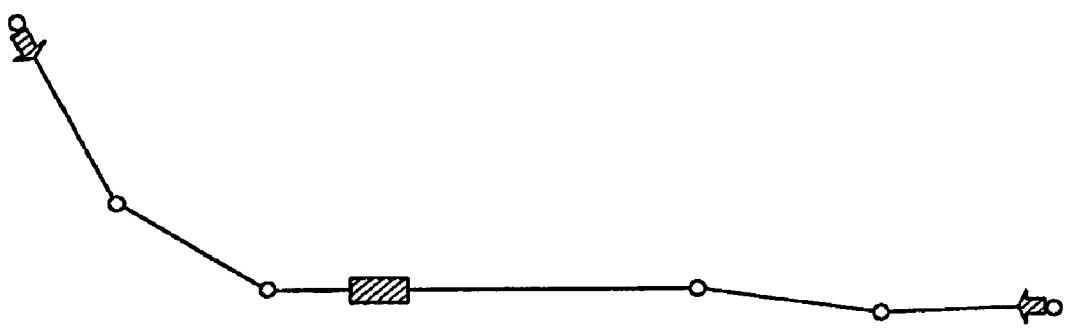
Figure 25:
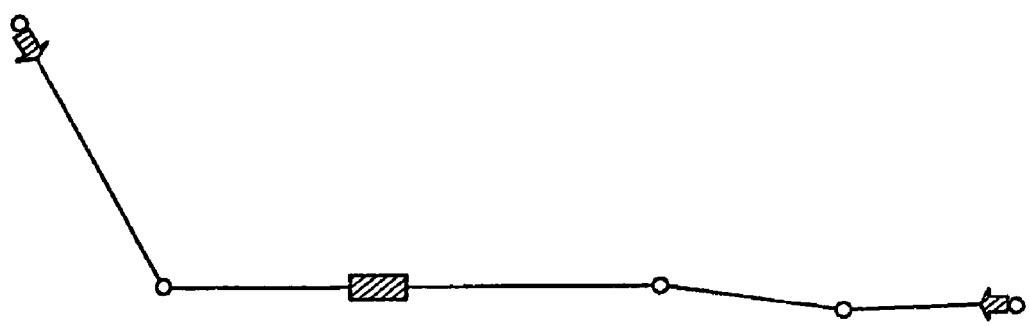
Figure 26:
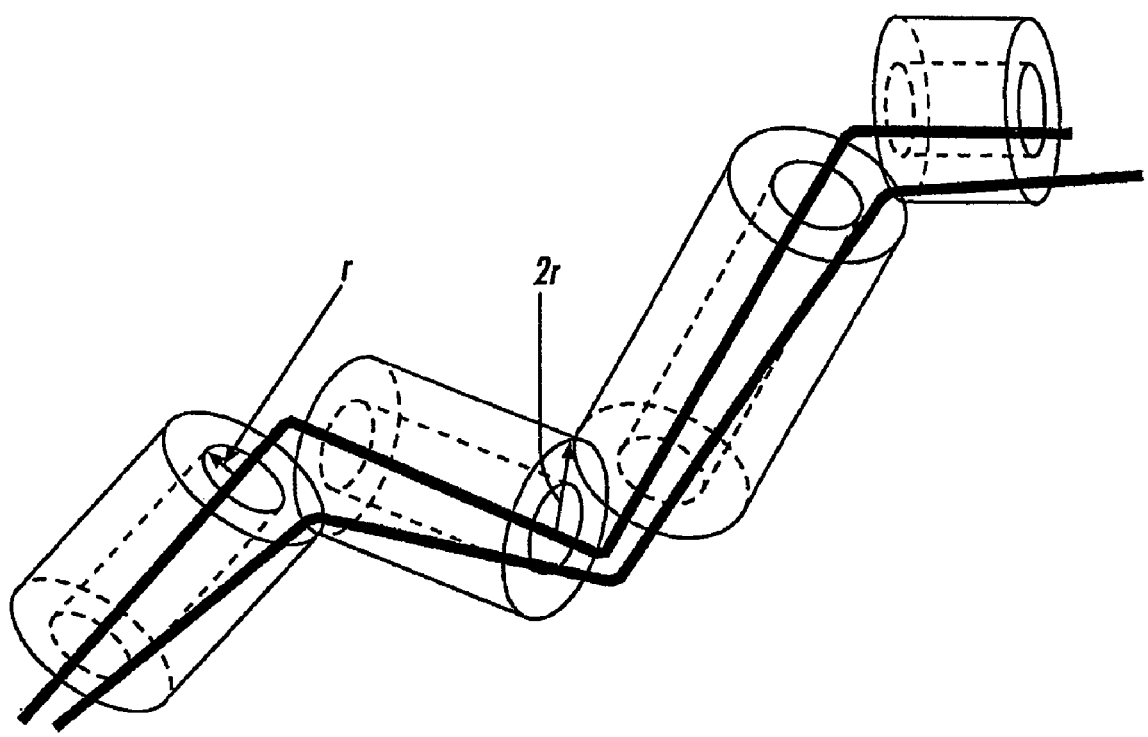
Figure 27:
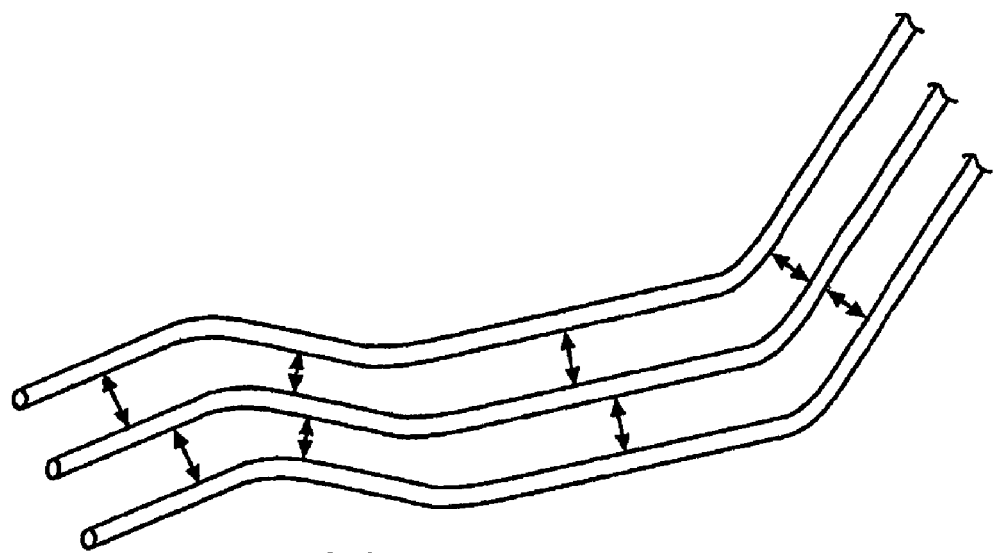
Figure 28:
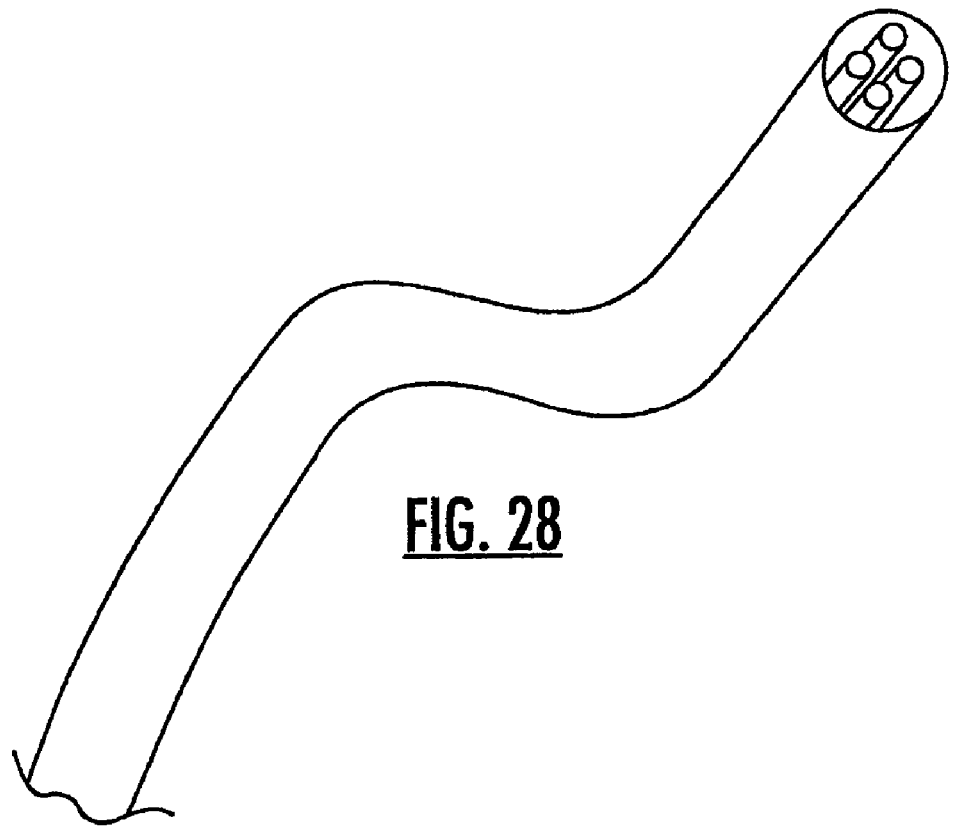
Figure 29A:
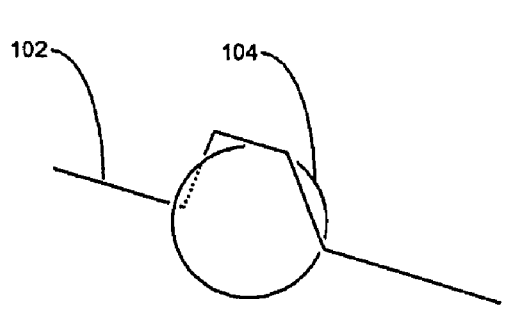
Figure 29B:
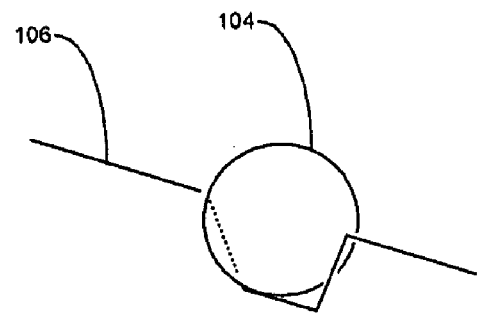
Figure 29C:
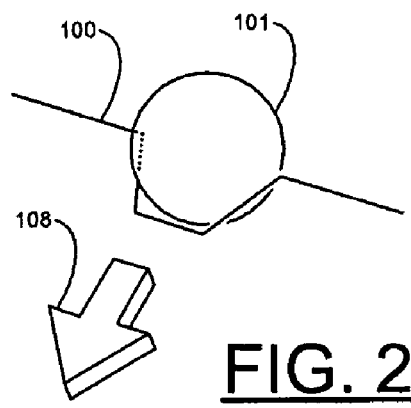
Figure 30:
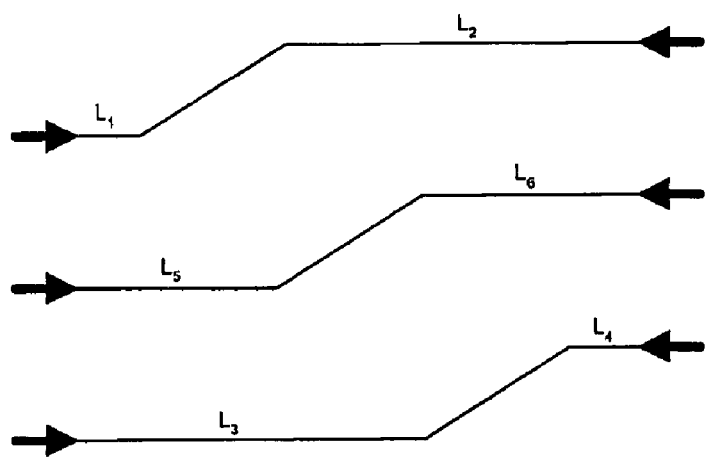
Figure 31:
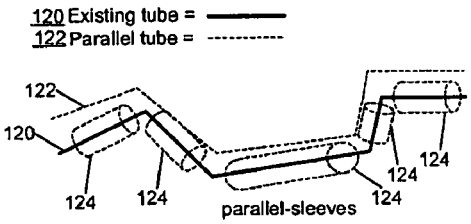
Figure 32:
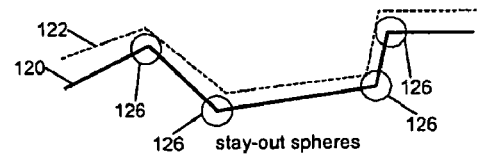
Figure 33:
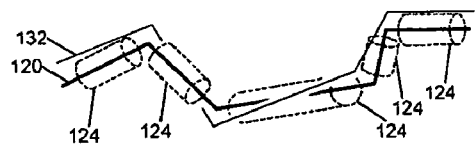
Figure 34:
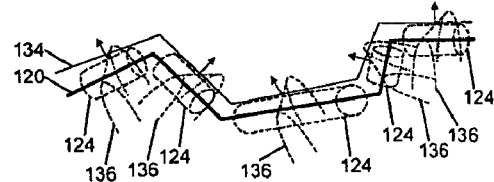
Figure 35:
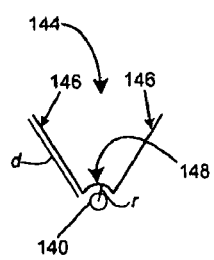
Figure 36:
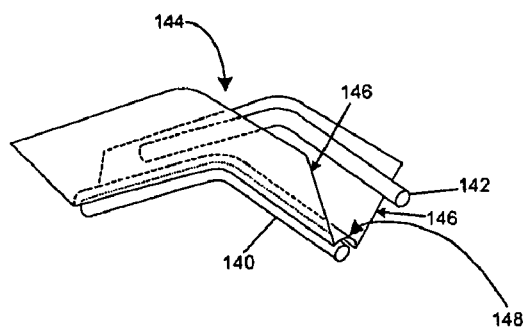
Figure 37A:
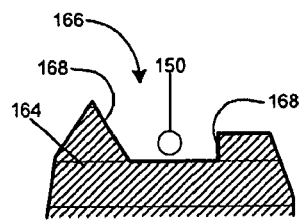
Figure 37B:
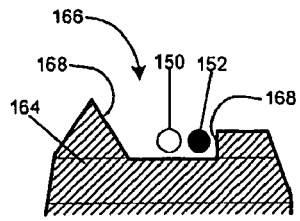
Figure 37C:
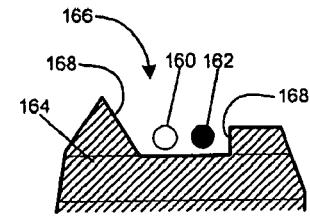
Figure 38A:
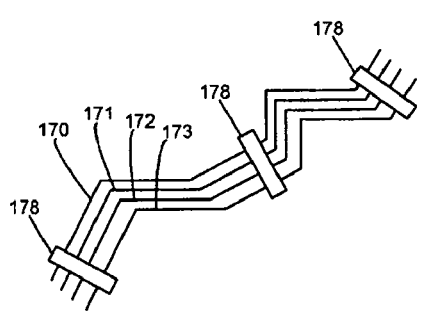
Figure 38B:
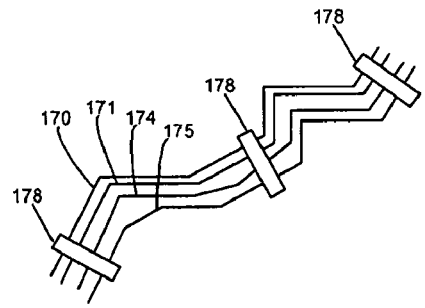
Figure 39:
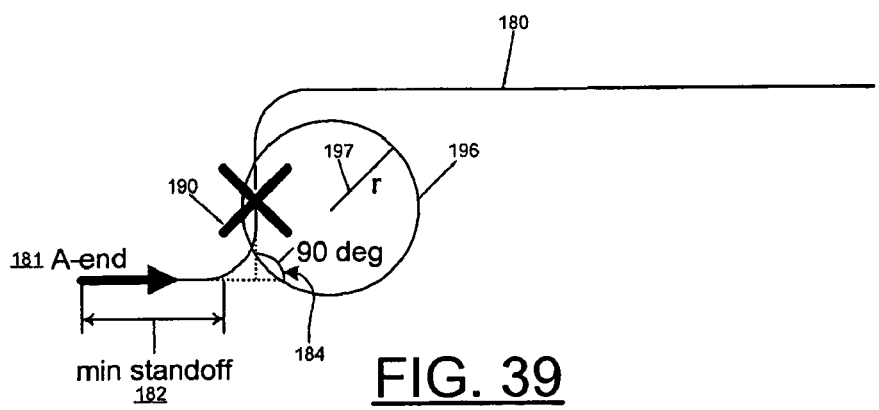
Figure 40A:
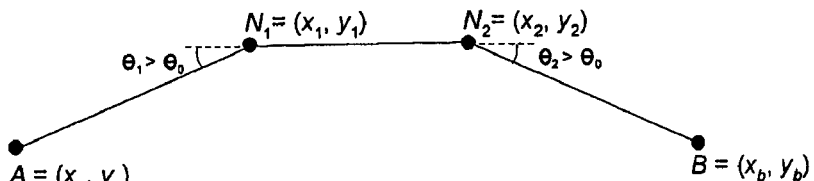
Figure 40B:
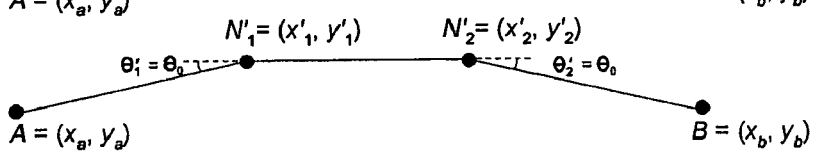
Figure 40C:
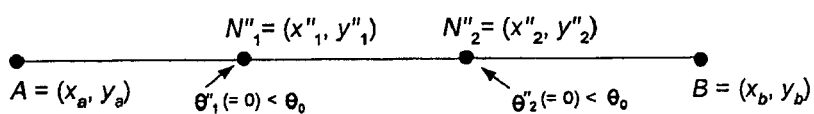
Figure 41A:
Figure 41B:
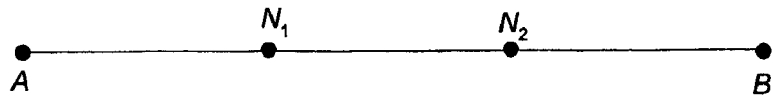
Figure 41C:

Having thus described the invention in general terms, reference will now be made to the accompanying drawings, which are not necessarily drawn to scale, and wherein:

FIG. 1 illustrates the route of a tube with three straight segments joined by two circular arcs;

FIG. 2 illustrates the desired standoff distance S from the B-end of a tube;

FIG. 3 illustrates a violation of the desired standoff caused by altering the position of one of the tube segments even though the node remains at the same location;

FIGS. 4A-4D are sequential views depicting the design of the route of a tube with the use of a three dimensional "compass" provided by, for example, CATIA;

FIG. 5 is a representation of the route of a tube having six nodes designated $N_1$-$N_6$;

FIG. 6 is another representation of the route depicted in FIG. 5 in which the nodes are illustrated as ball joints and the straight segments are illustrated as telescoping joints;

FIG. 7 is a representation of the route of the tube depicted in FIG. 5 in which node $N_4$ is moved upward as indicated by the arrow;

FIG. 8 is another representation of the route of the tube shown in FIG. 5 in which a clamp is moved upward;

FIG. 9 depicts a tube extending between a fitting and a bulkhead;

FIG. 10 illustrates another tube extending between the same fitting and the bulkhead after the position of the bulkhead has been changed relative to the bulkhead position depicted in FIG. 9;

FIG. 11 is a representation of the route of another tube having an intermediate portion connected to a structural element by means of a clamp;

FIG. 12 is another representation of the tube of FIG. 11 following movement of the structural element downward;

FIG. 13 is another representation of the tube of FIG. 11 following movement of the structural element upward;

FIGS. 14A-14F are graphical representations of a plurality of constraint objects;

FIG. 15 is a graphical representation of a plurality of constraint objects, possibly based upon background structure;

FIG. 16 illustrates a plurality of candidate routes that comply with each of the constraint objects depicted in FIG. 15;

FIG. 17 is a representation of a portion of the route of a tube that extends through a rectangular through loop and which illustrates a plurality of low level constraints that arise in the course of complying with the constraint object imposed by the rectangular through loop;

FIG. 18 is a representation of a plurality of constraint objects as well as a gross route that is feasible in that it complies with each of the constraint objects without necessarily being optimized in a continuous sense and while likely including an overpopulation of nodes;

FIG. 19 is an improved route that is also feasible in that it satisfies each of the constraint objects and that is optimized relative to the gross route depicted in FIG. 18, at least in terms of length since the route depicted in FIG. 19 is shorter;

FIG. 20 again depicts the route shown in FIG. 19 with a number of nodes that might possibly be deleted identified by arrows;

FIG. 21 is a representation of another route that is feasible in that it satisfies each of the constraint objects following removal of the nodes identified in FIG. 20;

FIG. 22 is an optimal route that satisfies each of the constraint objects and that is based upon the route that identified by FIG. 21 following optimization of each node location;

FIG. 23 illustrates a trial route having a plurality of nodes with an indication of the deviation of each node;

FIG. 24 is a representation of the route of a tube following a forward pass based upon the trial route depicted in FIG. 23;

FIG. 25 is a representation of a route of the tube following a backward pass of the nodes of the route depicted in FIG. 24;

FIG. 26 is a representation of the plurality of sleeves that surround respective segments of an existing tube in order to define a permissible region through which a new tube may extend;

FIG. 27 is a representation of a plurality of transport elements capable of being simultaneously routed, as in a bundle, in which inter-transport element constraints are represented by the double headed arrows;

FIG. 28 is a representation of a meta-transport element having a shape sufficient to contain a plurality of individual transport elements, thereby also supporting the simultaneous routing of a plurality of transport elements, as in a bundle;

FIG. 29A is a schematic diagram of a potential route a transport element circumventing a stay-out zone;

FIG. 29B is another schematic diagram of a potential route a transport element circumventing a stay-out zone;

FIG. 29C is a schematic diagram for routing a transport element to circumvent a stay-out zone using a simulation of gravity cost;

FIG. 30 is a schematic diagram of three potential routes with varying segment lengths;

FIG. 31 is a schematic diagram for routing a second transport element in relation to a first transport element surrounded by parallel sleeves;

FIG. 32 is a schematic diagram for routing a second transport element in relation to a first transport element protected by spherical stay-out zones;

FIG. 33 is a schematic diagram of a route for a second transport element in relation to a first transport element;

FIG. 34 is a schematic diagram for routing a second transport element in relation to a first transport element surrounded by parallel sleeves with associated stay-away direction constraints or costs;

FIG. 35 is an end view of a schematic diagram for routing a second transport element in relation to a first transport element and a routing gutter constraint;

FIG. 36 is a perspective view of a schematic diagram for routing a second transport element in relation to a first transport element and a routing gutter constraint;

FIG. 37A is a schematic diagram for routing a first transport element;

FIG. 37B is a schematic diagram for routing a second transport element in relation to the first transport element of FIG. 37A;

FIG. 37C is a schematic diagram for routing two transport elements with respect to each other;

FIG. 38A is a schematic diagram for bundle routing transport elements with similar node sets;

FIG. 38B is a schematic diagram for bundle routing transport elements with non-similar node sets;

FIG. 39 is a schematic diagram for representing a routing infeasiblity;

FIGS. 40A-40C are representations of routes for a transport element in relation to minimizing the length of the transport element between points A and B; and FIGS. 41A-41C are representations of routes for a transport element in relation to resolving ambiguity of node locations between points A and B.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The term constraint object is used to refer to the software entity that embodies a mathematical constraint or set of mathematical constraints grouped together in some way. This term is arbitrary; in fact, any number of similar terms, such as "constraint," "constraint set," "constraint group," "constraint bundle," "constraint macro," or "constraint unit," could be used. "Constraint object" is chosen for use herein because an embodiment may be implemented in terms of an object-oriented programming language, in such a manner that our "constraint objects" map directly to software objects. Thus, the term "constraint object" evokes a convenient association. Described further, the term "constraint" refers to a rule that some function of the independent variables (e.g., the node locations) cannot exceed a certain threshold or must equal a given value. Note that an equality case may be expressed as two inequalities. For example, the constraint x=2 can be expressed as $x \geq 2$ and $x \leq 2$. Therefore, it is convenient and standard usage to speak only of inequality constraints, since they subsume equality constraints.

It is important to observe that conventional parametric CAD systems are based on equality constraints alone. Equality relationships are set up between various quantities (e.g., length L is equal to one-third length L', etc., location of hole H is equal to the midpoint of a given segment S, etc.). When one parameter changes, there is essentially no freedom in choosing the other parameters-their values are uniquely determined by the parametric relationships involved. This formulation is usually called constraint programming, and the algorithms that implement it are usually called constraint solvers. Such technology is useful when it is known that there will be only one solution, or, in the event that there may be multiple solutions, any solution will do. Embodiments of the present invention, in contrast, are formulated in terms of constrained optimization, and the algorithms that implement embodiments of the present invention are called constrained optimizers. This is fundamentally different from conventional parametric CAD systems, in that there can be, and usually is, a preponderance of inequality constraints. For example, point P on a tube is less than or equal to one inch away from a given surface, or segment S of a tube passes through a hole of diameter three inches centered at a point x, which can be translated to the statement that segment S of a tube lies a distance less than or equal to 1.5 inches away from the center x of the hole. In such a formulation—which is critical to providing exactly the kind of flexibility and speed provided by embodiments of the present invention—it is very explicit that the formation will in general exact a large plurality of possible solutions. It is necessary to pick one of these possible solutions, and picking the best one is what a constrained optimizer does. It is in part this preponderance of inequality constraints that distinguishes embodiments of the present invention from conventional parametric CAD system and particular domain applications of parametric CAD systems.

An embodiment of a method of the present invention is adapted to design a route for a transport element. By way of example, a method will be hereinafter described in conjunction with the routing of a tube, such as the routing of a tube within an aircraft. However, the method is also applicable to routing a tube in applications other than an aircraft, as well as to the routing of transport elements other than tubes, such as cables, hoses, wires, wire bundles and the like. Additionally, the application of the method to the routing of a tube will be described hereinafter to generate a route generally consisting of one or more straight segments joined by circular arcs. Such a curve may be called an arc spline, with the restriction that alternate arcs have a finite or infinite radius (the degenerate case of infinite radius producing a straight line). This class of curve is advantageous as an example since it demonstrates the capability of the present invention to effectively choose the representation scheme, i.e., the number of nodes and their ordering with respect to the targets (described in more detail below, targets are essentially those constraint objects that represent "way-points" for the route). This representation scheme is also called the node distribution. However, the method of the present invention is capable of designing the route of a transport element so as to be defined by other classes of curves, if so desired. It should also be understood that the term "transport element" is intended to refer generically to both a single continuous and integral transport element and a series of transport elements interconnected one to another. Various aspects of the present invention and underlying technologies are described in *Constraint-Based Design of Optimal Transport Elements* by Michael Drumheller, Transactions of the ASME, J. Computing and Info. Science in Engineering (JCISE), Vol. 2, pp. 302-311 (December 2002), the contents of which are hereby incorporated by reference in its entirety.

According to the method, a gross route for the transport element is initially established. Typically, the gross route is defined by the designer, at least in part, and may be based upon various considerations as described hereinafter. According to the present invention, the gross route does not necessarily define an exact, specific path along which the transport element will extend. Instead, the gross route consists of constraint objects that the eventual route of the transport element preferably satisfies. As such, the constraint objects limit the possible routes for the transport element. However, the constraint objects generally do not determine a unique route for the transport element and, in fact, may not fix precisely or uniquely the position of any portion of the transport element.

The gross route may be defined by a variety of constraint objects. For example, at least some of the constraint objects may be related directly to, i.e., defined in terms of or as approximations of, the background structure. As graphically depicted in FIG. 14a, the starting point, i.e., the A-end, and the ending point, i.e., the B-end, of the transport element are constraint objects and are typically defined relative to the background structure, such as the fitting to which the opposed ends of the transport element must connect. In addition to merely defining the location ctr of the A-end and the B-end of the transport element, these constraint objects may define the direction dir along which the transport element should be oriented proximate the A-end and the B-end. In addition, these constraint objects may define an angular tolerance relative to the preferred direction to thereby define an allowable angular range about the preferred direction along which the transport element may approach the A-end or the B-end. Similar to the A-end and B-end, intermediate way points or hardpoints may be defined, to represent, for example, places where the transport element must run through a clamp at a specific position and with a specific orientation. As graphically depicted in FIG. 14b, the hardpoint may be defined not only in terms of location ctr, but the direction dir by which the transport element is to be oriented as the transport element passes through the hardpoint may be defined. An angular tolerance can also be associated with a hardpoint to define the acceptable angular deviation from the desired direction of the transport element as the transport element approaches the hardpoint. In addition, a spatial tolerance, typically defined in terms of a radius r, may be associated with the hardpoint to permit the transport element to pass anywhere within the finite radius of tolerance r of the hardpoint.

Another constraint object is an adjustable hardpoint. The adjustable hardpoint defines a region of space through which the transport element must pass and within which a hardpoint, typically defined by a clamp, must lie. In this regard, FIG. 14c depicts three different regions defined by respective adjustable hardpoints designated A, B and C. The transport element may pass anywhere within the region of space defined by the adjustable hardpoint and the hardpoint, i.e., $H_A$, $H_B$, and $H_C$, may be located anywhere within that same region. The method of the present invention may therefore not only automatically position the transport element to pass through the region defined by the adjustable hardpoint, but may also automatically position, by implication, the clamp or other structural element defining the hardpoint at any point within the region, preferably at a position that serves to more nearly optimize the resulting route of the transport element as described below, where optimality may be defined not just by the shape of the tube but by the assumed configuration of the structural elements governed by the adjustable hardpoints. (Note that a hardpoint as described herein above is a special case of an adjustable hardpoint in which the region of admissible locations has zero spatial extent—it is just a point. But it is such a common special case that it is given an individual status.) Several adjustable hardpoints may be placed in series with constraint relationships established between them. Constraint relationships are described herein below and include such relationships as requiring the hardpoint locations associated with adjacent adjustable hardpoints to be spaced apart by no more than a predetermined difference and/or to incur an increasing penalty or cost if the spacing between the adjacent adjustable hardpoints exceeds the predetermined difference. Additional penalties or costs may be associated with the adjustable hardpoints such as an increasing penalty or cost as the transport element and/or the location of the hardpoint approaches the boundary of the region. Thus, the method of the present invention may not only determine the optimal route for the transport element per se, but may simultaneously determine the optimal locations for the hardpoints within the respective regions.

Figure 14A:
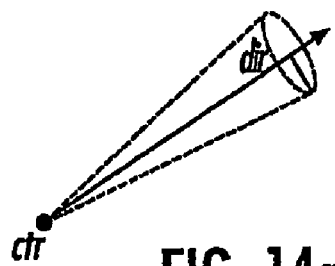
Figure 14B:
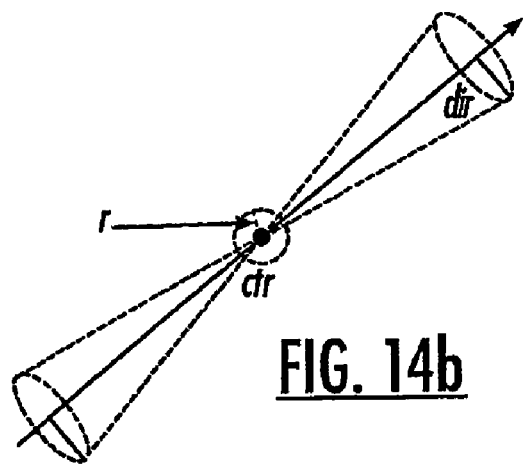
Figure 14D:
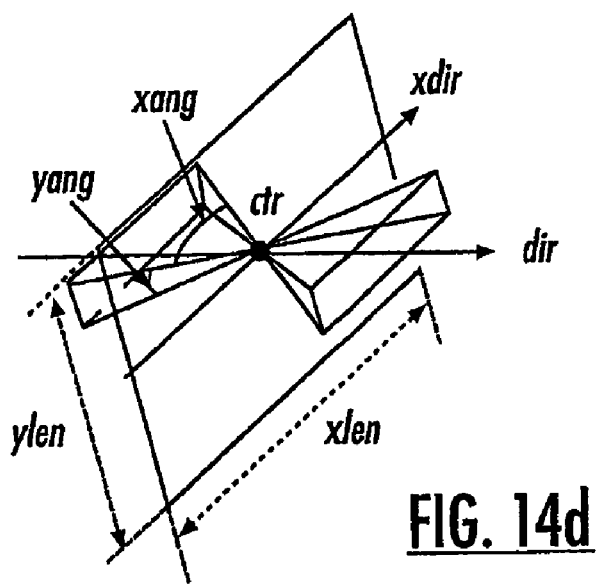
Figure 14C:
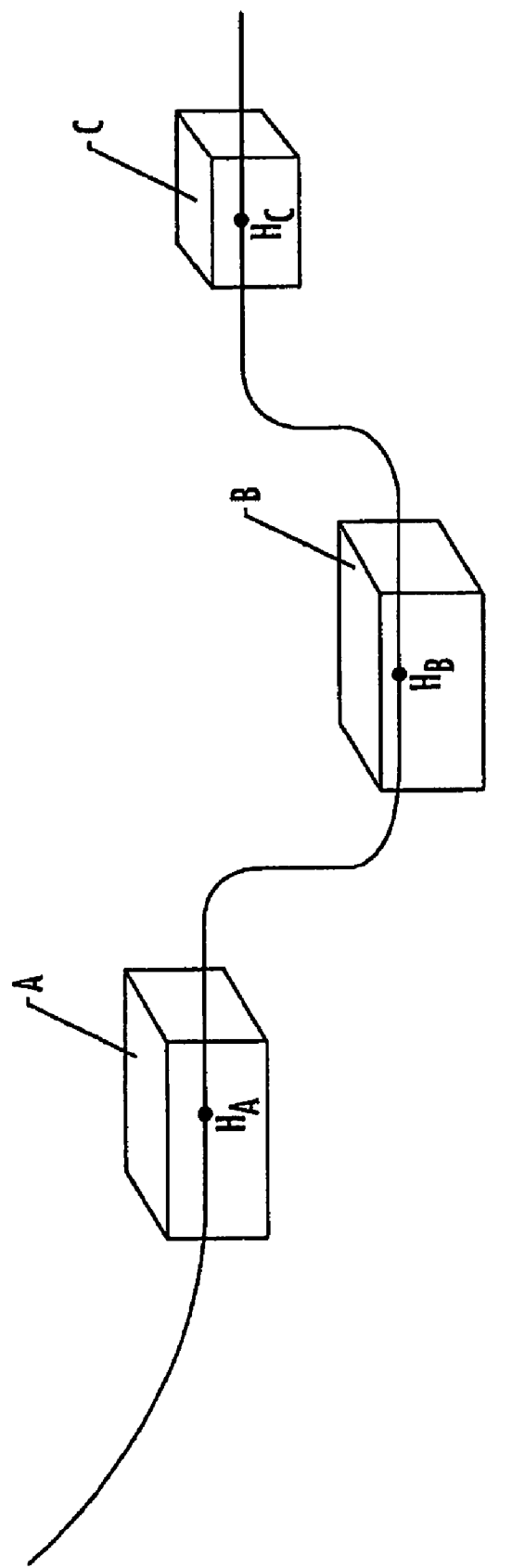

As another example, a through loop, such as a rectangular through loop, may be defined as depicted graphically in FIG. 14d. Typically, the rectangular through loop is defined in terms of the center ctr of the rectangle, a vector dir normal to the plane containing the rectangle, a vector xdir lying in the plane of the rectangle and the dimensions of the rectangle xlen and ylen. By utilizing a rectangular through loop, the transport element is permitted to pass anywhere within the bounds of the rectangle. In addition, an angular tolerance may be associated with the rectangular through loop to define the permissible angular deviation of the transport element from the normal vector. In this regard, one angular tolerance xang may be defined in the local x-direction as defined by the vector xdir and another angular tolerance yang may be defined in the local y-direction. While a rectangular through loop is depicted and described, the loop part may have other shapes, if desired. It should be noted that the final configuration of the transport element and, in particular, the point at which the transport element intersects the plane of the rectangle may be taken as the location of an actual clamp, bracket, hole or the like. Note that a through-loop may also be considered a special case of an adjustable hardpoint, where the admissible region happens to be flat, and bounded by the given loop.

Figure 14E:
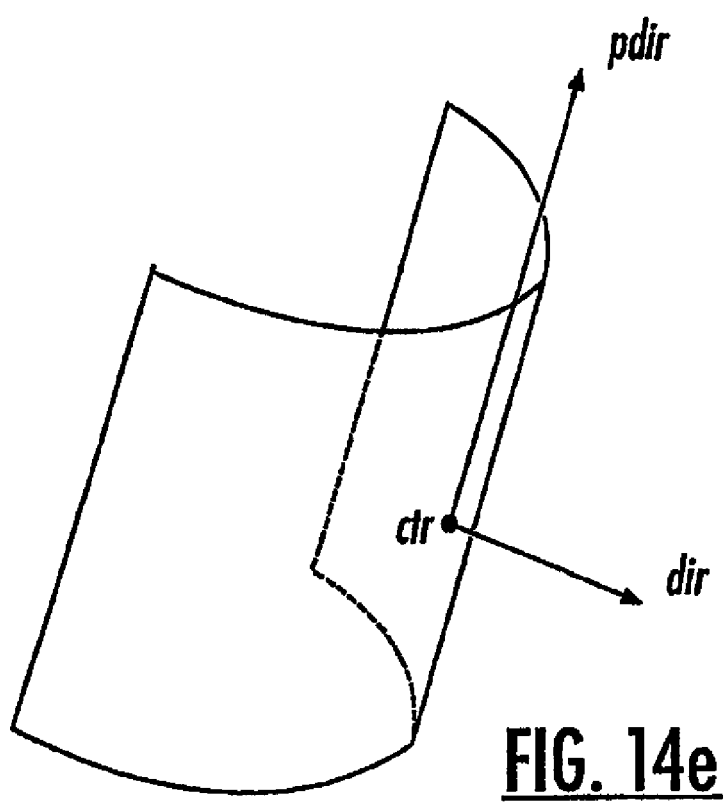

Another constraint object is a stay-away point which defines a sphere having a center and a radius through which the transport element may not pass. A less symmetric zone, such as a stay-out zone and more particularly a parabolic sheet stay-away zone, may also be defined as shown in FIG. 14e. The stay-out zone defines a region in space through which the transport element may not pass. In the illustrated embodiment, the parabolic sheet is typically defined in terms of the center ctr of the parabolic sheet and a vector dir extending normal to the parabolic sheet on the convex side of the parabolic sheet at the center of the parabolic sheet. In addition, a vector pdir perpendicular to the normal vector and also extending through the center point is defined. The asymmetric nature of the constraint forces the transport element to remain on one side or the other of the parabolic sheet stay-away zone. This gives the designer more specific influence than a sphere; it effectively allows the designer to block out more space. Note that a parabola is merely one example of a "one-sided" stay-out zone. Many other formulas could describe a shape that extends infinitely in one direction.

Figure 14F:
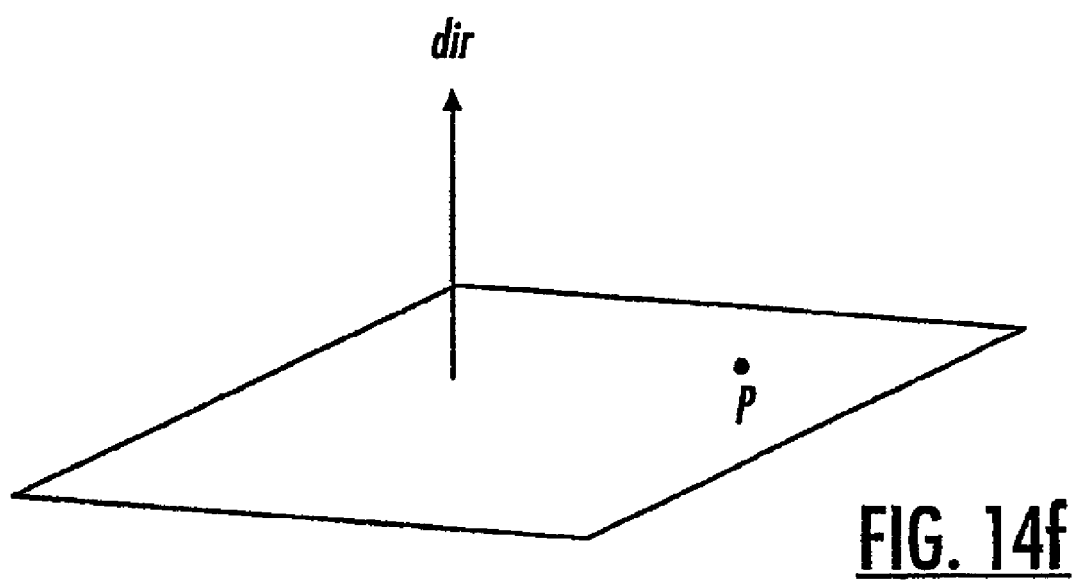

Another example of a constraint object is a stay-in plane constraint as shown in FIG. 14f which defines a plane in terms of any point p that lies within the plane and a vector dir normal to the plane. With respect to a stay-in plane constraint, a portion of the transport element must lie in the plane. Similarly, a stay-away plane constraint may be defined in terms of any point that lies within the plane and a vector normal to the plane. With respect to a stay-away plane, at least one portion of the transport element must lie on one side of the plane. While the foregoing examples illustrate the variety of constraint objects, a number of other constraints may be established including stay-out boxes and stay-out rounded boxes to name a few. As such, the variety of constraint objects is essentially arbitrarily extensible.

At least some of the above-described constraint objects also have an associated offset or a standoff. An offset is the minimum length of a straight section of the transport element that must appear on one side of some constraint objects, such as a hardpoint that may represent the mounting of a transport element to a clamp. In this regard, a straight section of transport element must extend outward from each side of the hardpoint. Analogously, for the A-end or the B-end, a standoff is defined as the straight section of the transport element that must extend outward from the A-end or the B-end prior to a bend in the transport element. As will be apparent, the offsets and standoffs permit, for example, tool access and fitting clearance.

As the foregoing examples demonstrate, at least some constraint objects may be implemented in terms of more elementary constraints, the character of which may be predominantly that of inequality constraints. An inequality constraint limits the possible routes without fixing the position of any portion of the transport element. Inequality constraints do not generally specify that the transport element must, for example, coincide with a specific point in space, such as the ctr point of an A-end, B-end, or hardpoint. In contrast, an inequality constraint merely defines bounds within which, or outside of which, the value of some function of the transport element's dependent variables must lie. By comparison, conventional CAD systems only use equality constraints to find solutions to equations or systems of equations, rather than using inequality constraints to find optimal solutions to inequalities or systems of inequalities. Examples of inequality-constraint-dominated constraint objects include the rectangular through loop, a stay-out zone, and any other type of constraint object that does not precisely fix any aspect (e.g., location, orientation, etc.) of any portion of the transport element, but instead defines a region or range within which, or outside of which, the transport element should lie. As exemplified by the through loop constraint, inequality constraints may define a limit such that the eventual route of the transport element will be constructed so as to be within the limit. As exemplified by the stay-out zone constraint, inequality constraints may define a limit such that the eventual route of the transport element will be constructed so as to be outside of the limit.

By way of an example, FIG. 15 depicts a collection of constraint objects for a transport element that must be routed between two fittings. In this example, the A-end constraint object coincides with a fitting with which the starting end of the transport element must connect. The hardpoint constraint object is placed to coincide with a clamp that will engage the transport element. The rectangular through loop coincides with a region of a beam web in which it is permissible to drill a hole. The stay in plane constraint object coincides with the surface of a piece of equipment or other structure on which a clamp is mounted for connection to the transport element. In this regard, a stay-in plane constraint object, as opposed to a hardpoint constraint object, is utilized since it is known only that the clamp will be placed upon the surface of the equipment or other structure, but it is not known the exact location of the clamp. (Such a plane, when used in this regard, may be viewed as a special case of an adjustable hardpoint.) The stay-out zone constraint object effectively covers or shields a piece of equipment or another transport element which the transport element that is in the process of being routed may not approach more closely than some predefined distance. Finally, the B-end constraint object coincides with another fitting with which the ending end of the transport element must be connected. As will be apparent, the constraint objects do not, in general, precisely determine the route of the transport element, but do place limits upon the eventual route of the transport element while abstracting and simplifying the background structure, thereby generally making the problem of routing the transport element in an optimized manner more mathematically tractable than if the background structure were treated in its full detail. In a CAD system, for example, the background geometry is typically represented by a very complex patchwork of splines and other surfaces. To implement, for example, a stay-out zone directly in terms of this representation is computationally problematic because it typically involves calculating the distance from a transport element, or portion of a transport element, to the surface in question. If the surface in question can be "proxied" by a simplified piece of geometry, like a stay-out sphere, parabolic sheet, box, etc., then the distance calculation becomes more amenable computationally because such simple shapes admit efficient distance-calculation algorithms. In fact, in practice, the set of constraint objects available in an embodiment of the present invention may be precisely the set of shapes for which such distance calculations can be rendered in fast algorithms. In other words, the whole point of many constraints objects is to provide "proxies" for background geometry that support fast distance calculations. The reason fast distance calculations are important is that, during the solution (optimization) of a particular sub-problem (sub-problems are described below) it may be necessary to calculate the distance from the transport element to the proxies thousands of times.

The constraint objects, such as those depicted in FIG. 15, determine a typically infinite set of possible routes that satisfy the constraints (i.e., are feasible). In this regard, several different feasible routes are depicted in dashed lines in FIG. 16.

Constraint objects typically give rise to, i.e., are implemented in terms of, a number of other low-level or primitive constraints. In this regard, constraint objects may be viewed as "bundles" or "macros" comprising many low-level constraints packaged together in potentially complex ways. To illustrate this "macro" idea, reference is made to FIG. 17, in which a transport element penetrates a through-loop constraint object. As illustrated, the transport element intersects the plane defined by the rectangular through loop at point C, which is spaced from loop edge 1 by $d_1$, loop edge 2 by $d_2$, loop edge 3 by $d_3$ and loop edge 4 by $d_4$. In addition, the transport element intersects the plane defined by the through loop at an angle of xang relative to the normal vector measured in the local x-direction and an angle of yang from the normal vector measured in the local y-direction. Offsets of $O_U$ and $O_D$ are also defined between the point C at which the transport element intersects the plane defined by the through loop and the point $T_U$ at which the bend that is immediately upstream of the through loop becomes tangent to the straight section that penetrates the through loop and point $T_D$ at which the bend immediately downstream of the through loop becomes tangent to the straight section that penetrated the through loop, respectively. The upstream and downstream offsets $O_U$ and $O_D$, the distances between the point of intersection between the transport element and the plane defined by the through loop to each of the loop edges $d_1$, $d_2$, $d_3$ and $d_4$ and the angular offsets from the normal vector Xang and Yang are considered low level constraints that arise as a result of the imposition of the through loop constraint object. The terms "cost function" or "costs" refer to a function of the independent variables that is to be minimized by some algorithm. For example, a cost function might be the length of the transport element. Given a family of possible transport elements that all satisfy some given constraints, it is often preferable to choose the shortest transport element (although this is not the only possible cost function to minimize). Cost functions are described more fully below, including the concept of multiple cost functions.

The concept of multiple cost functions is important in the present invention and is explained further in relation to a two-dimensional problem of minimizing the length of a transport element $TE_{AB}$ composed of three straight segments between two fixed points A and B in the plane, subject to a minimum-bend-angle constraint. That is, a cost function is used to minimize the length of transport element $TE_{AB}$. This situation is illustrated with three different cases in FIGS. 40A, 40B, and 40C, where Case 1 is shown in FIG. 40A, Case 2 is shown in FIG. 40B, and Case 3 is shown in FIG. 40C. A constraint is imposed such that each bend angle (where bend angles are measured supplementarily) must be greater than or equal to a critical value $\theta_0$. The transport element $TE_{AB}$ has four independent variables (the x-y coordinates of the two nodes $N_1$ and $N_2$ that define the bends between the segments). In Case 1 of FIG. 40A, $N_1$ and $N_2$ are positioned such that the bend angles $\theta_1$ and $\theta_2$ well exceed the bound $\theta_0$. In Case 2 of FIG. 40B, $N'_1$ and $N'_2$ are such that the bend angles $\theta'_1$, and $\theta'_2$ are just at the bound $\theta_0$. In Case 3 of FIG. 40C, $N''_1$ and $N''_2$ are such that the angles $\theta''_1$ and $\theta''_2$ are in violation of (i.e., less than) the bound $\theta_0$. Case 3 minimizes the cost function (length), but is not permitted because Case 3 violates the minimum-bend-angle constraint. Case 1 does not violate the minimum-bend-angle constraint, but does not exhibit the lowest possible value of the length cost function. Case 2 is the best that can be done without violating the minimum-bend-angle constraint.

As describe above, only one cost function (length) has been imposed. This cost function may be written as $$C_{len}(x_1, y_1, x_2, y_2) = [(x_a - x_1)^2 + (y_a - y_1)^2]^{\frac{1}{2}} +$$
$$[(x_1 - x_2)^2 + (y_1 - y_2)^2]^{\frac{1}{2}} +$$
$$[(x_2 - x_b)^2 + (y_2 - y_b)^2]^{\frac{1}{2}}$$

In traditional mathematical notation, the complete problem could be stated as $$\min C_{len}(x_1,y_1,x_2,y_2) \, s.t. \, \theta_1 \geq \theta_0 \text{ and } \theta_2 \geq \theta_0 \, x_1,y_1,x_2,x_2$$

In plain English, the above problem describes a process of effectively searching over values of $x_1$, $y_1$, $x_2$, $y_2$ such that $\theta_1$ and $\theta_2$ do not fall below the critical value $\theta_0$, and choosing the values of $x_1$, $y_1$, $x_2$, $y_2$ that cause $C_{len}$ to be smallest.

To see how multiple cost functions can arise, suppose that in addition to a constraint on the bend angles $\theta_1$ and $\theta_2$, a cost is also associated with the bend angles. Whenever such a cost is associated with a constraint in this manner, the cost gives an indication of how far a given quantity is from its preferred value. As an example, suppose that there were some value $\theta_{pref}$ (greater than $\theta_0$) for which the angles would be preferred to have, if possible. (For concreteness, assume that $\theta_{pref}$ equals the value of $\theta_1$ and $\theta_2$ shown in Case 1 of FIG. 40A.) Note that the angles still are never allowed to be below $\theta_0$, a value that may be called the not-to-exceed (NTE) value. The word "exceed" is to be interpreted loosely in this regard, since it can mean either greater or less than the NTE value, according to the context. For example, in the context of a minimum-bend-angle constraint, "exceed" means "to go below," but in the context of a maximum-bend-angle constraint, "exceed" means to "to go above." In other words, there is always a constraint (an inequality rule) at the NTE value. But the concept of a preferred value and a cost associated to encroachments past the preferred value toward the NTE value may also be introduced.

For example, a cost function corresponding to the bend angle $\theta_1$ at $N_1$ might be $$C_{\theta_1}(x_1,y_1,x_2,y_2) = (\theta_1 - \theta_0)^2 \text{ if } \theta_1 < \theta_0, \text{ else zero}$$

and an analogous cost function $$C_{\theta_2}(x_1,y_1,x_2,y_2) = (\theta_2 - \theta_0)^2 \text{ if } \theta_2 < \theta_0, \text{ otherwise zero}$$

would correspond to the bend angle $\theta_2$ at $N_2$. Essentially these functions say "as long as a bend angle is above the preferred value, the bend angle does not incur any cost, but as the bend angle passes the preferred value and encroaches toward the NTE value, a positive, increasing cost—the squared term—is incurred." The cost of each angle is a function of both nodes $N_1$ and $N_2$—this hints at how, in general, a given constraint is sensitive to the whole transport element, not just the parts that might seem relevant by virtue of their localness.

Now there are three cost functions, $C_{len}$, $C_{\theta 1}$, and $C_{\theta 2}$. By assumption, a user may wish to minimize all three cost functions simultaneously. The question that arises is "What does it mean, exactly, to minimize all three cost functions simultaneously, i.e., how much should one cost function be minimized in relation to the other cost functions?" There is a general trade-off phenomenon to be faced: in order, for example, to make one bend angle "good" it might be necessary to make another bend angle "bad," or it might be necessary to make the transport element longer. The various cost functions are in conflict, or competition, with one another.

There are several approaches to formulating and solving such a multi-objective (or multi-criterion) optimization problem. The most rigorous and complex methods involve consideration of the Pareto surface (also called the Pareto frontier or the trade-off surface). Such methods are discussed in many references, such as Normal Boundary Intersection: A New Method for Generating the Pareto Surface in Nonlinear Multicriteria Optimization Problems, by John Dennis and Indraneel Das, Society of Industrial and Applied Mathematics (SIAM), Journal of Optimization, Vol. 8, No. 3, pp. 631-657 (1998). These methods are not described herein, but are potentially applicable to embodiments of the present invention.

The simplest and most common approach to multi-objective optimization is to simply combine the functions together into a single weighted cost function, e.g., $$C = \alpha_{len} C_{len} + \alpha_{\theta 1} C_{\theta 2} + \alpha_{\theta 2} C_{\theta 2}$$

where, for brevity, the arguments $(x_1, y_1, x_2, y_2)$ have been omitted. The values $\alpha_i = \{\alpha_{len}, \alpha_{\theta 1}, \alpha_{\theta 2}\}$ are called the weights. Typically the convexity conditions $$\alpha_i \geq 0 \text{ and } \Sigma \alpha_i = 1$$

are imposed on the weights for mathematical convenience or other technical reasons. The variable C may be called the overall cost function, and the functions such as $C_{len}$, $C_{\theta 1}$, and $C_{\theta 2}$ may be called member cost functions. The basic idea is that the behavior of the overall cost function C mimics more closely the heavier-weighted member cost functions. For example, if all but one of the weights were zero, then the overall cost function would be identically equal to the non-zero-weighted member function. Thus, a user can adjust the relative importance of the various members simply by adjusting the relative magnitudes of the weights $\alpha_i$ of a member cost function. If the user decides that length should receive more emphasis than preferred bend angle violations, the user can increase the magnitude of $\alpha_{len}$ relative to $\alpha_{\theta 1}$ and $\alpha_{\theta 2}$ The end result is that the multiple cost functions are combined into a single cost function, which is easy for humans to understand (i.e., the single cost function representing multiple member cost functions can be "tuned" via the weights to reflect, to greater or lesser degree, the contributions of an arbitrary subset of the member cost functions).

An additional constraint object may be a planarity constraint. A planarity constraint refers to forcing at least a portion of the route for a transport element to be planar, without forcing a particular orientation of the plane. (One advantage of a planarity constraint is that the design of planar transport element route segments may be re-used on either side of a bilaterally symmetrical vehicle.) One manner of implementing a planarity constraint is to impose an equality constraint between the normalized vectors that form the axes of bends. For each bend in the portion of the route subject to the planarity constraint, this is the cross product of the direction vectors of the two straight segments that emanate from the bend. These normal vectors may be denoted as $n_i$ at bend i. A planarity constraint may then be embodied by an equality constraint between the components of normalized vectors $n_i$, $n_{i+1}, n_{i+2}, \ldots n_{i+j}$ for bends i through j in the portion of the route subject to the planarity constraint.

By utilizing constraint objects, the designer can effectively limit and simplify the amount of background structure which will have an influence upon the route of the transport element. Typically, the constraint objects do not have the same degree of geometric complexity as does the background object, if any, proxied by the constraint object. However, the constraint object may mimic the shape of an object, or capture a salient feature of the object such as its general orientation, may determine other aspects of the trajectory of the transport element, such as a direction of the transport element, in the region of the object, and is well suited mathematically, as mentioned earlier, as a data structure to be considered during the determination of the optimal route of the transport element. It should be noted, however, that while constraint objects can advantageously represent various objects of the background structure, the constraint objects do not necessarily represent any real object, but can be inserted by the designer as the designer sees fit, such as based upon the designer's intuition about the proper routing of the transport element, even if the constraint object has no obvious basis in the background structure.

In addition to merely defining a number of independent constraint objects, the method according to one aspect of the present invention permits relationships to be established between at least two of the constraint objects. For example, it may be desirable for a transport element to penetrate a series of holes at the same angle and the same spatial offset so that the same style of bracket or clamp may be used at each hole to engage the transport element. While the designer may not care, at least within certain limits, about the actual values of the angle or offset, the designer will require that the angle and spatial offset be the same at all penetration locations. In marked contrast to merely selecting an angle and then requiring that the transport element penetrate each hole at the selected angle, the method of this aspect of the present invention permits the actual angle to be varied so long as the transport element penetrates each hole at the same angle and offset. As such, the value of the angle may be varied according to this aspect of the method in order to optimize the resulting route of the transport element.

In addition to the constraint objects which may or may not, in a given instance, be based upon the background structure, but whose nature might lead them to be seen as intended to potentially model or directly reflect some aspect of the background structure, the method of the present invention may establish constraints that are not related in an obvious or straightforward geometric manner to the background structure. For example, a constraint may fix the slope of at least some segments of the transport element to a constant value or to be above or below a predetermined value. In addition, a constraint may fix at least some segments of the transport element to be planar in order to facilitate duplication of the routing of the transport element, since planar sections can generally be utilized on either the left or right side of a vehicle without modification.

Other constraints may be established that are intrinsic constraints that are not related at all to the background structure, but are, instead, dependent only upon the shape of the transport element itself. In this regard, intrinsic constraints generally include constraints such as the minimum bend angle, the maximum bend angle, the minimum straight section length between bends, a constant bend radius and the like. As such, the intrinsic constraints usually arise from the limitations inherent in the manufacture or installation of a transport element that arise as a result of the manufacturing equipment or in the assemblability, as in the maximum curvature introduced into a hose or wire. Since the intrinsic constraints are dependent upon the type of transport element that is being routed, other types of transport elements may have other intrinsic constraints.

Additional cost functions include simulation-of-gravity costs and segment-length-based regularizer costs. Potential routing scenarios often involve design symmetries or ambiguities. As such additional constraints and costs functions may be imposed to resolve design ambiguities. As shown FIGS. 29A and 29B (the "crankshaft" or "expansion loop" example), two routing scenarios may offer no a priori reason to prefer one configuration over another, such as how the route 102 for the transport element passes over a stay-out zone 104 in FIG. 29A but the route 106 for the transport element passes under the stay-out zone 104 in FIG. 29B. To address this type of routing ambiguity, a simulation-of-gravity cost may be imposed. For example, one method may have a preference for a cost that simulates gravity pointing in a default direction. Alternatively, a user may be able to define a default gravity direction, such as by controlling a simulation of gravity cost directional icon 108 as shown in FIG. 29C. As such a gravity direction does not need to relate to gravity in its common physical property of a force attraction to the approximate center of Earth, but may relate to any directional propensity. One implementation may be to impose a cost proportional to a gravitational potential energy-like function of each segment in the route for the transport element. Other implementations may be related to a directional propensity with no real-world physical analogy, such as where a user defines a simulation-of-gravity cost with a directional icon 108 which controls how the route for the transport element 100 will circumvent the stay-out zone 101 as shown in FIG. 29C.

Another additional cost for addressing routing ambiguities is a segment-length-based regularizer cost, also referred to as a simply a segment-length regularizer For example, as shown in FIG. 30, lengths $L_1$, $L_2$; $L_3$, $L_4$; and $L_5$, $L_6$ of connected segments of a transport element may have no design difference, i.e., there may be no cost function difference between two or more lengths for connected segments of the transport element. A segment-length-based regularizer cost may be imposed to resolve the ambiguity by imposing a preference. For example, supposing in FIG. 40C that there were no minimum-bend-angle constraint, then Case 3 would be a legal configuration. However, there is an inherent ambiguity in Case 3, because $N_1$ and $N_2$ could lie anywhere along the line connecting A and B.

A segment-length regularizer might, for example, introduce a cost function equal to the sum of the squares of the lengths of the straight segments. Recall the length cost function from above:

$$C_{len}(x_1, y_1, x_2, y_2) = [(x_a - x_1)^2 + (y_a - y_1)^2]^{\frac{1}{2}} +$$
$$[(x_1 - x_2)^2 + (y_1 - y_2)^2]^{\frac{1}{2}} +$$
$$[(x_2 - x_b)^2 + (y_2 - y_b)^2]^{\frac{1}{2}}$$

Such a function is invariant under displacements of $N_1$ or $N_2$ along the line between A and B. This can be easily seen by supposing that all the y values are zero. Then the above formula looks like $$C_{len}(x_1, y_1, x_2, y_2) = [(x_a - x_1)^2]^{\frac{1}{2}} + [(x_1 - x_2)^2]^{\frac{1}{2}} + [(x_2 - x_b)^2]^{\frac{1}{2}}$$
$$= (x_a - x_1) + (x_1 - x_2) + (x_2 - x_b)$$
$$= x_a - x_b$$

which is a constant. To put it in graphical terms, all three of the configurations of FIGS. 41A, 41B, and 41C have the same length. A sum-of-squares segment-length regularizer, in contrast, would not have the square-roots and would look like $$C_{sumsq}(x_1, y_1, x_2, y_2) = (x_a - x_1)^2 + (y_a - y_1)^2 +$$
$$(x_1 - x_2)^2 + (y_1 - y_2)^2 +$$
$$(x_2 - x_b)^2 + (y_2 - y_b)^2$$

The function $C_{sumsq}$ obtains its minimum only for the configuration of FIG. 41B. That is, any unevenness in the spacing of the nodes $N_1$ and $N_2$ causes $C_{sumsq}$ to increase. In other words, $C_{sumsq}$ tends to "regularize" (make regular) the spacing of the nodes. There are many different potential applications of such principles in the present invention—the general principle being that where there is an otherwise ambiguous situation (mathematically, a class of invariant transformations exists), it is usually possible, and desirable, to impose an additional cost function whose purpose is precisely to "break the tie."

A number of interactions with constraint objects such as offsets, distances from stay-out zones, etc. may be defined as constraints and/or cost functions. When there is a constraint (an NTE value) that also has associated with it a preferred value, and an increasing cost function is assigned to the interval between the preferred value and the NTE value, as discussed above, it is conventional in some contexts, and can be convenient, to refer to the associated cost function, or the combination of constraint-cum-associated-cost-function, as a "soft constraint." This is because a "hard constraint" (i.e., what is simply referred to as the "constraint") is "softened" by the additional cost function that "leads up to it." There is some inherent ambiguity in the "hard constraint"–"soft constraint" dichotomy because a "soft constraint" is really just another cost function. Further, there are some contexts in which "hard constraint" denotes the presence of a function in the formulation that cannot be evaluated at all unless the constraint is satisfied. The term "soft constraint" is preferably used only when there will be no ambiguity, and the reader is reminded that a "soft constraint" is not a constraint in the usual mathematical-optimization sense.

In this regard, both NTE and preferred values may be assigned for each constraint. More precisely, for any constraint, such as minimum bend angle, separation from a stay-out zone, or separation from the inner edge of a though-loop, "the constraint setting" is not a single entity but is actually a pair of entities: the NTE value and the preferred value of the relevant independent variable. The preferred value is, in some sense, "better" or "less extreme" than the NTE value. For example, in the case of minimum-bend-angle, an NTE value might be four degrees and the preferred value might be eight degrees, and this is interpreted to mean "try to obtain eight degrees, but if necessary, because of competition with other cost functions, the value may be as extreme as four degrees."

With regard to constraints and cost functions, each constraint and cost function pertains to a particular function of the independent variables. (Recall that the independent variables are, for example, the node locations (see, e.g., FIGS. 40A-40C), but the independent variables can be more general than node locations, e.g., for a sliding hardpoint the independent variables can include the position of the hardpoint within the admissible region. For convenience, the values of all such functions are referred to as dependent variables. A dependent variable can, in some cases, be identically equal to an independent variable. For example, a constraint might be applied directly to $x_i$, the x-coordinate of the i-th node's location. In such a case $x_i$ is an independent variable, and there is a dependent variable that just happens to be the identity function applied to $x_i$.

For every dependent variable governed by an NTE/preferred pair, an important convenience offered by embodiments of the present invention is the ability to explicitly allow the designer, as a convenience, to choose between four different "enforcement modes." The term violation cost refers to the cost due to transgressions past the NTE value toward the preferred value. The four different enforcement modes referred to above are:

(1) Hard-NTE where the NTE is heeded, as a constraint bound, but the violation cost is ignored. In short, the preferred value is ignored. The computed quantity can take on any NTE value and has no cost due to variance from a preferred value.

(2) Hard—Preferred where the NTE value is temporarily ignored and a constraint is set at the preferred value. This amounts to just a "tightening" of the NTE value.

(3) Hard+Soft—this is the "normal" mode, where there is a constraint at the NTE value and the violation cost is included in the overall cost function. The final value of the relevant dependent variable thus tends to end up between the preferred value and the NTE value, but never past the NTE value.

(4) Soft-only—in this mode, there are no constraints; the constraint is ignored and only the violation cost is heeded. Note that the violation cost function must generally be defined for all values of the relevant dependent variable, whereas in mode (3) it need not generally (at least for some implementations) be defined beyond the NTE value, because the relevant dependent variable may not be allowed to go beyond that value anyway.

Based upon the plurality of constraints and/or costs, the method of the present invention automatically defines a route for the transport element. In this regard, a route that complies with each of the constraints is preferably defined such that the route will be feasible. In addition, the route is preferably defined such that the route complies as closely as possible with the preferred values dependent variables, by virtue of the (optional) associated "soft constraint" cost functions. While a plurality of routes likely may be defined that are feasible, i.e., that comply with each of the constraints, the method of the present invention preferably selects, by means of an optimization procedure, a unique, optimal member from the plurality.

In order to permit the route to be optimized, an overall cost function is preferably defined based upon one or more member cost functions based on dependent variables associated with the route. One way to define an overall cost function in terms of the member cost functions was described in an earlier section herein where multi-criteria optimization and weights are discussed at length. For brevity, we refer to the member cost functions as simply "cost functions," and reserve the term "overall cost function" to refer to the result of combining member cost functions in some way, such as with weights as described in another section herein. Overall cost functions may be defined depending upon the relative importance of the various cost functions. In this regard, the length of the transport element is frequently something that is desirably minimized. As such, one cost function may be the length of the transport element; as such, shorter transport elements are regarded as having lower cost than longer transport elements. Another cost function may be the compliance of the transport element. Compliance is essentially the amount of "give" in a transport element and depends not only on the shape of the transport element, but on the type and arrangement of the fixtures into which the transport element will be installed. In this regard, the fixtures themselves are often regarded, for convenience, as having zero compliance. Since transport elements cannot be manufactured without some error, and since the fixtures into which the transport element is installed are also imperfect, every transport element is installable only because it exhibits some compliance. Additionally, a transport element having a large degree of compliance will generally be subject to lighter loads upon installation than a very stiff or non-compliant transport element. For example, given two end-fittings that are collinearly opposed, one design might connect them with a straight length of tubing. But another design might introduce a "crankshaft" or "U" shape into the tube, even though this clearly makes it longer. The reason is that a straight tube cannot be stretched very much in the longitudinal direction, so the length of the tube must match the spacing between the end-fittings very closely. But if there is a "U" bend in the middle of the tube (sometimes called an expansion loop, see e.g. FIG. 29) the ends of the tube can vary in distance from one another without introducing excessive stresses into the tube or the end-fittings. If the installation loads are too great, the transport element will generally be rejected at the shop floor, obviously a disadvantageous result since labor, materials, and time will already have been expended to manufacture the transport element and since the assembly process will have to be halted. As such, transport elements having a relatively high compliance are generally correlated with a low probability of rejection. In this regard, compliance is so important that designers otherwise often introduce expansion loops into transport elements for the express purpose of increasing the compliance of the transport element. Further details regarding compliance are provided by Y. F. Wei, et al. "Tube Production and Assembly Systems: The Impact of Compliance and Variability on Yield", Proceedings of ASME Design Automation Conference (September 2000).

Another cost function may be the flow resistance of the transport element. In general terms, the more curvature that a transport element has, the greater the flow resistance of the transport element. While various levels of analysis, and corresponding software programs, are possible for computing the flow resistance of various transport element designs, the number of bends along the route of a transport element or a simple function of the integrated curvature as well as the length of the transport element may be utilized to approximate the flow resistance or head drop along the route of the transport element.

In one embodiment, the contribution of each cost function may be weighted, according as it is more or less important in the designer's view. As such, the overall cost function or cost function defined by the weighted combination of the member cost functions for each feasible routing of the transport element would then be used as an objective function in an optimization (i.e., an efficient, automated search) procedure, and a route of the transport element that minimizes the weighted combination would be selected as the optimal route for the transport element.

The method of the present invention can also utilize many types of cost functions. As described above, for example, preferred values can be assigned to various dependent variables. In this regard, preferred values can be assigned to one or more of the intrinsic constraints, such as the minimum bend angle, the minimum straight segment length, etc., as well as one or more of the design characteristics previously discussed, such as the length of the transport element, the flow resistance, the compliance of the transport element or the like. Additionally, a preferred-value violation cost function (or simply "violation cost function") for variances from the preferred value may also be defined. Although any violation cost function may be utilized, the violation cost function is typically a smoothly increasing function, in order to facilitate the most common and effective numerical optimization algorithms. As such, an overall cost function may be established based upon the cost of the variances from the preferred values of selected parameters ("soft constraints"). The route of the transport element having the lowest cost of variances will then generally be selected as the optimal route of the transport element. While the violation costs for variances from a preferred value may be defined in various manners, one definition of a violation cost is described below:

$$\text{Violation Cost} = \begin{cases} 0, & A \le P \\ \left[\frac{A-P}{A-D}\right]^2, & A > P \end{cases}$$

wherein A is the actual value of the parameter, D is the NTE value assigned to the parameter and P is the preferred value of the parameter. As mentioned above, other definitions of the violation cost may be utilized including smoothed staircase-shaped functions that may more accurately represent the discontinuous jumps in cost that occur, for example, when transitioning from one manufacturing process to another. For example, the violation cost associated with a bend that defines an angle less than the minimum bend angle may be based upon the cost of bending the tube without the cost being a constant c up to a 120°, 2c for a bend between 120°-170° since a different machine must be utilized to bend the tube, and 10c for a bend greater than 170° since the bending process must be performed manually.

The total violation cost for a given design characteristic may therefore be the sum of the violation costs along the route. For example, in instances in which the violation cost is the minimum bend angle, the violation cost, if any, for each bend may be summed to produce the total violation cost. The optimal route of the transport element is selected based upon the overall cost function which may combine the violation cost and one or more other design characteristics, typically in a weighted manner. The optimal route is therefore generally defined by minimizing the violation cost summed or otherwise combined with any other design characteristics that form a portion of the overall cost-function. By doing so, the method may effectively drive all violations along the route of the transport element towards a weighted compromise value. Alternatively, the optimal route of the transport element may be selected to minimize the greatest violation. While this method would permit all violations to tend to (i.e., move toward) a shared or common value that is slightly less than the maximum violation without further penalty, some designers may find this technique useful.

As described above, after establishing the overall cost function, an optimization (i.e., an efficient, automated search) procedure is applied to investigate possible feasible routes, and an optimal route is selected. It is noted that in some cases, there may be no unique optimal route. For example, two different routes may have the same length, the same bend angles, etc. and may differ only in their node spacing. In such cases, other costs may be combined into the overall cost function, such as a cost for unequal node spacing, in order to differentiate the routes.

According to one embodiment to the present invention, however, the optimization is defined heuristically by the following steps:

(1) identifying an initial guess, which is just a very rough placement of nodes-essentially a node distribution plus a small amount of spatial information;

(2) creating an easy pass route, which is a continuously optimized route that satisfies each of the constraint objects, but that is not necessarily optimal with respect to the final object function and may not necessarily satisfy all of the intrinsic constraints, yet which likely gives a rough indication of what shape a route must have in order to "thread" through the constraint objects;

(3) identifying the nodes of this easy pass route that appear to be most significant or salient, in terms of their contribution to the shape of the route;

(4) constructing trial routes containing just the end nodes and then progressively readmitting the most significant or salient nodes from the easy pass route until a good route is found (this is called the forward pass); and (5) optionally suppressing nodes that are found, on second examination, to add an insignificant contribution to the shape, thus possibly finding an even better route (this is called the backward pass).

Thus, tube routing may be viewed as a matter of placing in space, e.g., by hand, path-constraint objects, like hardpoints, stay-in and stay-out zones, etc. that typically involve, or may involve, many inequality constraints. One can view the node distribution (the number of nodes and how they are distributed amongst the constraint objects) as a variable in the design problem, rather than a human design choice. Importantly, this variable is treated automatically by the present invention.

By comparison, a conventional CAD tube routing application will only automatically create one of two things for a route between endpoints A and B, with no obstacles or other entities in between:

(a) the shortest legal route, or (b) a set of orthogonal (not necessarily shortest) routes from which to choose one route in the set.

To extend the complexity of the above situation such as by adding a hardpoint between end points A and B, a conventional CAD tube routing application will break that situation into two routing cases and use what is sometimes called an "auto-route" facility to solve each case separately, which will typically not be an optimal solution, unless by chance.

To create an initial guess, a method estimates a node distribution and imparts to it a small amount of spatial information. A node distribution defines the number of nodes (i.e., bends) a transport element will have and how they lie relative to targets. Given a set of targets, a method determines how many nodes or bends lie between each pair of adjacent targets. In one embodiment, pre-defined heuristic rules may be employed for how many nodes should be guessed between any two kinds of targets. This number may be a function not only of what kinds of targets they are, but also of what kinds of section constraints, if any, lie between them. (The section constraint concept is described in detail below). For example, there may be a rule that between any two rectangular-hoop constraint objects the initial guess will contain two nodes, which lie in line with the respective dir vectors and at distances equal to the respective preferred offsets from the respective ctr points. In addition, a number of extra nodes are generally inserted in the region of, e.g., a stay-out zone, to give enough degrees of freedom to circumvent the stay-out zone. A typical initial guess is illustrated by FIG. 18.

In order to define the easy pass route, which satisfies most of the constraints, but is not necessarily optimized using the eventual overall cost function and constraints but is instead optimized for efficiency according to a simplified overall cost function such as length, and may not satisfy all of the intrinsic constraints, it may be advantageous to relax the minimum bend angle constraint and the minimum straight section length constraint to insure that some feasible route is identified. This is the reason for the term "easy pass"—an easy pass route involves constraints that are easier to satisfy, the purpose being merely to "bootstrap" the process by first identifying a rough indication of what shape a route must have to "thread" through the constraint objects and then returning to the easy pass route to optimize the route with respect to the final object function and satisfy all of the intrinsic constraints, thereby achieving an optimal feasible route. Note that to increase the likelihood that a feasible route is found by performing an easy pass, the initial guess upon which the easy pass is based generally includes an over-estimate of the number of nodes, such as two or three nodes between any two targets.

Although a forward-pass/backward-pass method (described below) may be very efficient in automatically determining a good node distribution, some computational burden can nevertheless be relieved by imposing additional constraints consisting of lower or upper number-of-nodes limits, thereby providing a "node-distribution hint," i.e., an estimate of how many nodes should be placed between any two adjacent targets, or how many nodes are desired between any two adjacent targets. Upper and lower number-of-nodes limits may substantially reduce the number of continuous sub-problems that must be constructed and solved due to re-admissions during the forward pass and/or suppressions during the backward pass. In one embodiment, a user may specify the upper and lower number-of-nodes limits for every inter-target interval. Alternatively, or in addition, a method may rely upon pre-defined, default upper and lower number-of-nodes limits. Further, a method may use the upper and lower number-of-nodes limits between certain adjacent targets in a previous solution as the upper and lower number-of-nodes limits for subsequent routing, such as when modifying a previously designed route. Similarly, a method may re-use the node distribution en masse from a previous routing solution as a special case of the general concept of number-of-nodes limits, such that the subsequent route uses exactly the same number of bends between every pair of adjacent targets as were present in the previous route.

Upper number-of-nodes limits may be implemented, for example, by removing a random subset of nodes between any two adjacent targets exceeding the upper number-of-nodes limit from an initial guess. In the forward-pass/backward-pass process (described below), there can never be any more nodes between any two targets than were present in the initial guess. Lower number-of-nodes limits may be implemented, for example, by placing at least the lower number-of-nodes limit number of fixed nodal point targets having an infinite spatial tolerance in an interval between every two adjacent targets and with zero nodes between node-within-sphere targets. A node-within-sphere target is a spherical stay-in zone for a given node; it consists of a center point and a radius defining a spatial tolerance. By definition, precisely one node is required to exist for each node-within-sphere target, and that node must reside within the corresponding sphere. In the initial guess, a node is placed, as a guess, at the center of each such node-within-sphere target, and there are no nodes placed between any two adjacent node-within-sphere targets. Thus, by assigning the node-within-sphere targets an infinite radius, they effectively require there to be a node somewhere, but does not restrict where the node must be located. Thus, if a pair of adjacent targets has n node-within-sphere targets of infinite radius between two otherwise-adjacent targets, then there will be at least a minimum of n nodes between the adjacent targets. This is just one possible way of implementing minimum number-of-nodes limits.

The initial-guess route is essentially "relaxed" to form the easy pass, via a continuous optimization algorithm such as NPSOL, to a position that still conforms with the constraint objects but is shorter, and generally does not contain gross violations of extrinsic constraints (e.g., it does not run right through a stay-out zone, as the initial guess might). A typical easy pass route is shown in FIG. 19. Thereafter, the nodes that are less important to the overall shape, such as the nodes at which the transport element bends only slightly, are identified and deleted. If the deletion of a node renders the resulting route of the transport element infeasible, the node is readmitted even though the node initially appeared to be of less importance. By way of example, the nodes along the route of the transport element depicted in FIG. 20 that are indicated with arrows, appear to be of less importance since the transport element bends only slightly at these nodes. By deleting each of these nodes, the route of the transport element then extends as shown in FIG. 21. By way of further example, a technique for identifying the less important nodes will be hereinafter described. The position of the remaining nodes of the route depicted in FIG. 21 are not necessarily optimal since the remaining nodes were positioned in the context of a route having a different set of nodes. In this regard, the measure of optimality of a route is seen to be dependent upon the number of nodes and their ordering relative to the constraint objects. The route is therefore re-optimized in a continuous sense, such as by moving the nodes as necessary in order to decrease the overall length of the route while still complying with the various constraint objects. An example of the further optimized route of the transport element is depicted in FIG. 22. Although the continuous optimization can be performed in various manners, many commercially available or otherwise off-the-shelf software programs such as NPSOL can perform the optimization. Further details regarding the optimization of this type of continuous problem are provided, for example, in the book *Practical Optimization* by Gill, Murray and Wright.

The identification of the less important nodes may be performed in a variety of manners. By way of example, however, one embodiment of a heuristic method for identifying the less important nodes of a transport element route will be described hereinafter. In this regard, an easy pass route, such as depicted by FIG. 19 is originally constructed. The nodes of the easy pass route is feasible with respect to most of the constraints contained in the constraint objects (i.e., the extrinsic constraints), but is not necessarily optimal with respect to the final, full overall cost function, and, in order to increase the likelihood that some easy pass is found, does not necessarily satisfy all intrinsic constraints and is likely overpopulated with nodes. The easy pass route will be termed the original node list. A straight segment is then constructed through the first and last nodes of the original node list. In other words, a straight segment is constructed that extends between the A-end and the B-end of the initial route. The perpendicular deviation of each intermediate node of the original node list from this straight segment is then measured. A modified route is then constructed by readmitting the node whose deviation from the straight segment is the greatest. The original node list is considered as split at the readmitted node which is called a breakpoint, thereby creating two new node sublists.

For each node sublist, the perpendicular deviation for each intermediate node of the node sublist that is not yet included in the modified route is determined. In other words, for each node sublist, the deviation of the nodes that lie between the first and last, i.e., the endmost, nodes of the respective node sublist from the respective straight segment extending between the endmost nodes of the respective node sublist is determined. For each node sublist, the node having the greatest deviation is chosen as a breakpoint to be added to the modified route, thereby further subdividing the route and creating two new node sublists. This process is repeated for each of the newly created node sublists until each of the nodes of the original node list has been used as a breakpoint or an endpoint. As a result of this process, the deviation for each node at the time of its selection as a breakpoint is noted. This process is termed recursive subdivision; it should be noted that the recursive subdivision process follows a general outline found in classical algorithms in computational geometry for developing piecewise-linear approximations to curves. The final result is a ranking of the nodes according to their order of re-admission, i.e., their perpendicular deviation.

In order to construct the optimal route of the transport element, a trial route is constructed that extends linearly between the first and last nodes, i.e., between the A-end and the B-end. An attempt is made to continuously optimize this route by means of NPSOL or the like, during which process a determination is made as to whether it is feasible, i.e., if it can satisfy each of the constraint objects and the intrinsic constraints such as minimum bend angle and minimum straight-section length. If not, the node from the original node list having the greatest deviation, as determined above, is re-admitted to create a modified trial route. Following the re-admission of the node, an attempt is made to optimize continuously the modified trial route, such as by means of NPSOL or the like, during which process a determination is made as to whether the modified trial route is feasible. If not feasible, the process of re-admitting additional nodes is continued with the node having the greatest deviation as described above being re-admitted and attempts made to optimize the resulting trial route and, as a result, to determine if it is feasible. For a feasible route, the process of defining the route of the transport element could terminate.

However, preferably, once feasibility is obtained, one or more additional nodes are admitted, however, to determine whether the further modified route of the transport element is improved by the addition of one or more nodes. In this regard, a measure of the optimality of each feasible route is obtained based upon the overall cost function, and is compared to previous trial routes to determine whether the optimality is improving. This measure of optimality may be identical to the overall cost function or cost function utilized during the continuous optimization, but generally may be different based upon the designer's preference. For example, it may include a function of the number of nodes, whereas the number of nodes is by definition a constant from the point of view of the continuous optimization process. This entire process of readmitting nodes is termed a forward pass. During the forward pass, an improvement threshold is typically established, such as 10%, such that if the measure of optimality of the further modified route exceeds the measure of optimality of the prior route by at least the improvement threshold, the process of further admitting additional nodes from the original node list and reoptimizing the resulting route is continued. If, however, the measure of optimality of the further modified and optimized route is not greater than the measure of optimality of the prior route by at least the improvement threshold or if the further modified route is infeasible, the process of further admitting additional nodes from the original node list is discontinued. In this instance, the prior route is also identified as the optimal route and the most recently admitted node is deleted to return to the prior route. As such, the process continues until the further modified route is either not feasible or is not a substantial improvement in terms of optimality relative to the prior route.

While the improvement threshold is generally greater than zero, the improvement threshold may be zero such that the process of admitting additional nodes continues so long as the further modified route makes even a slight improvement in optimality vis-a-vis the prior route. Additionally, while the embodiment of the method described heretofore terminates upon re-admitting an additional node from the original node list that makes the further modified route infeasible or that fails to improve the measure of optimality of the prior route by at least the improvement threshold, the method may be constructed to look ahead such that a predetermined number of nodes may be re-admitted following the determination that a further modified route is infeasible or failed to improve the measure of optimality of the prior route by at least the improvement threshold since there are instances in which although the re-admission of an additional node will cause the resulting route to be infeasible or to fail to improve the measure of optimality of the prior route by at least the improvement threshold, the addition of further nodes will not only make the resulting route feasible, but will significantly increase the measure optimality of the resulting route.

Once the most nearly optimal route is determined, the process may be discontinued. In one embodiment, however, the nodes of the resulting route are examined once more to ensure that each node is really necessary. In this regard, it is possible that a node having a relatively low deviation was re-admitted during the forward pass. For example, a node that is not strictly needed for feasibility may have a moderate deviation, while another node that is strictly needed for feasibility may have a very low deviation. As such, the node that is not strictly needed for feasibility will have been re-admitted prior to the node that is required for feasibility due to the relative deviations of the nodes. By way of example, an initial route that is feasible in that it satisfies the constraints at the A-end and the B-end as well as a hardpoint constraint object is depicted in FIG. 23. The route has five nodes numbered in order of decreasing salience or deviation, with node 1 having the greatest deviation and node 5 having the least deviation. In this regard, the dashed lines indicate the successive straight segments through the endpoints of respective sublists and the dotted lines indicate the deviations of the nodes from the respective straight segments. In this example, node 2 has a slightly greater deviation than node 3, even though node 2 is not strictly necessary for feasibility. After performing the forward pass, a route as depicted in FIG. 24 is obtained.

Based upon the route generated by the forward pass depicted in FIG. 24, the nodes are re-ranked in terms of deviation in a comparable manner to that described above in conjunction with the forward pass. In this regard, a straight segment is constructed that extends from the A-end to the B-end. The node of the route constructed by the forward pass that deviates most greatly from the straight segment is then identified as a breakpoint. The straight segment is then divided into two straight subsegments, each of which extends between respective endpoints. For each subsegment, a node sublist is created consisting of the endpoints and intermediate nodes lying therebetween. For each node sublist, the perpendicular deviation for each intermediate node from the respective straight subsegment is determined. In other words, for each node sublist, the deviation of the nodes that lie between the nodes defining the ends of the respective straight subsegment from the respective subsegment is determined. For each node sublist, the node having the greatest deviation is chosen to thereby further subdivide the respective straight segment into two additional subsegments, each of which has an associated node sublist. This process is repeated for each of the newly created node sublists until each of the nodes of the original node list have been re-admitted. As a result of this process, the deviation for each node at the time of its selection is noted. It is noted that the deviation of the nodes of the route constructed by the forward pass will typically differ from the deviation of any comparable nodes of the initial route since the route constructed by the forward pass will usually have fewer nodes and the nodes may be in somewhat different locations as a result of the optimization processes performed during the forward pass.

Beginning with the node having the least deviance, the least deviant node is deleted. An attempt is then made to optimize the modified route, such as by means of NPSOL or the like, and, as a result, the feasibility of the modified route is determined. If the modified route is feasible, the relative optimality of the route is also determined. If the node is deleted and the resulting route remains feasible and the optimality does not significantly decrease, i.e., does not decrease by more than a predefined degradation threshold, the process, termed the backward pass, continues by deleting the remaining node having the least deviance in the same manner as described above. As also described above, the measure of optimality against which the degradation threshold is applied might generally differ from that used or seen by the continuous optimization process. Note that during the backward pass it may be advantageous to re-compute the deviations at each step.

If the route is infeasible or if the measure of optimality substantially decreases, such as by more than the predefined degradation threshold, however, this process may be halted and the node that was most recently deleted is re-admitted to define the modified route. Alternatively, the backward pass may look ahead by deleting one or more additional nodes to determine whether the resulting route again becomes feasible and if the measure of optimality of the resulting route increases or, at least, does not substantially decrease. If so, the backward pass may continue until the route is again infeasible or the measure of optimality decreases by more than the degradation threshold and the further deletion of one or more additional nodes does not revive the feasibility of the route and cause the measure of optimality of the resulting route to increase. Upon completing the backward pass, the resulting route is not only feasible, but tends to have a small number of nodes, at least with respect to the original overpopulated centerline. An example of the modified route following the backward pass is depicted in FIG. 25.

The method of the present invention generally produces an optimal route as well as a cost report identifying cost violations attributable to variations from the preferred values or the NTE values for various design characteristics or parameters. Based upon this information, the designer may vary the preferred values or may reweight the relative importance of variations from the preferred values and then re-execute the method in order to find another route. As such, the method permits a designer to readily experiment with the relative importance of different design characteristics so as to select the route that is not only feasible, but is most appropriate for the situation. It is noted that the re-execution of the method following adjustment of the weightings may be performed very quickly since it need not involve re-searching "node-space", i.e., repeating the forward/backward pass(es). Additionally, the designer is able to address problems more directly by adjusting design characteristics that are conceptually very closely related to the specific problem. For example, in order to relieve a too-small bend angle, the designer need not consider all of the indirect ways in which to effect the relief, such as lengthening a segment and shortening another segment. Instead, the designer need merely increase the weight associated with violations of the minimum angle requirement. Although not described above, the designer can also introduce additional nodes into the resulting route if the designer feels additional nodes are appropriate, such as for increasing compliance or the like. In fact, a whole class of constraint objects are those that force nodes to exist at certain locations or within certain regions (such as the node-within-sphere targets described above). Thus, the designer can always exert an arbitrary degree of control over the placement of nodes, should they wish to override the placement made automatically, for example. By way of example, FIGS. 19-22 depict, in their upper right corner, a node-within-sphere constraint object that forces a node to exist inside a certain sphere.

The optimization technique described above is a heuristic method for approaching what is in principle a mixed integer problem. However, the optimization problem including the initial selection of the nodes in terms of the number of nodes and the ordering of the nodes with respect to the constraint objects as well as the concomitant continuous optimization of the number and positions of the nodes may be treated more generically as a mixed integer problem and solved by a mixed integer solver, such as any number of classical brand-and-bound methods, or the pattern-search method exemplified by the NOMAD package of Dennis and Audet of Rice University and the Ecole Polytechnique de Montreal. There are many other possible algorithms Mixed integer problems are ones where some independent variables are integers and other are continuous. In this application, the integer variables describe the number of nodes and their general ordering with respect to the constraint objects, and the continuous variables describe the exact spatial locations of the nodes.

Mixed-integer problems and their solutions are well studied. Thus, for completeness a description of the application of a general mixed-integer formulation to the design of a route of a transport element in accordance with the present invention is provided in conjunction with the class of curves appropriate for representing bent-metal tubes. These are once-differentiable curves consisting in alternating straight segments of positive length and circular arcuate segments of positive finite length. In other words, these curves are arc-splines, i.e., splines consisting in a sequence of circular arcs, with the feature that every other arc has an infinite radius, i.e., is straight, and the remaining arcs all have a common finite radius. However, as noted elsewhere, the method of the present invention may also be applied to other classes of curves, more or less complicated than this exemplary curve, such as cubic B-splines, etc.

A mixed-integer optimization problem is one in which some, but not all, of the decision variables, i.e., independent variables, may take on only integer values. The rest may take on arbitrary real values. As mentioned above, some generic packages for solving mixed-integer problems exist including NOMAD. It is noted that the heuristic method described above already solves a mixed-integer problem. However, the heuristic formulation described above is different from the formulation accepted by a generic package like NOMAD. The reason is that a generic mixed-integer solver must be fed a fixed set of independent variables or decision variables, a fixed cost, and a fixed set of constraints. In contrast, the heuristic method described above works with integer variables that are effectively a very compact encoding of the number of bends and their ordering relative to the constraint objects, such that for each point in that integer space the set of non-integer decision variables is different. That is, the heuristic method presented above is better thought of as formulating the problem in terms of a varying set of decision variables, costs, and constraints.

In order to illustrate the manner in which the problem could be formulated in terms of fixed set of variables, consider a route that must extend from the A-end, through a pair of loops, through a way-point or hardpoint and to the B-end. To approach the problem as a general mixed-integer problem, one could postulate an overpopulation of nodes. Each node represents three continuous decision variables, the x, y, and z coordinates of the node. With the $i^{th}$ node, two sets of constraints $C_{i,a}$ and $C_{i,b}$ are associated. In this sense, a constraint is a function with associated upper and lower bounds. More particularly, $c_{i,a}$ is a constraint on all the continuous decision variables that requires the segment just before the $i^{th}$ node and the segment just after the $i^{th}$ node to be parallel. This could be, for example, one minus the inner product of the associated unit vectors, with upper and lower bounds zero. $C_{i,b}$ contains, among others, a constraint that forces any bend at the $i^{th}$ node to fall within the minimum and maximum bend angle constraints. This would be, for example, the cosine of the bend angle, with appropriate upper and lower bounds. This second set $c_{i,b}$ also generally contains many other constraints, such as those on offsets and other interactions with the external constraint objects, i.e., loops, stay-out zones, hardpoints, etc.

In addition there are integer decision variables that effectively turn the constraint sets $C_{i,a}$ and $C_{i,b}$ "on" or "off". That is, there are some artificial variables $\phi_j$ that can take on only integer values, and are used as multipliers on the constraints $C_{i,a}$ and $C_{i,b}$. Thus the final constraints in the mixed-integer problem may generally be written (with the subscripts omitted for clarity) as follows:

lower_bound $\leq \phi c \leq$ upper_bound

Thus when the $\phi$ multiplying a given c is zero, the c is "off", or trivially satisfied, and when the $\phi$ multiplying a given c is 1, the c is "on", i.e., they become non-trivial. It should be noted that other formulations may be utilized without departing from the spirit and scope of the present invention. Furthermore the $\phi$'s are subject to the constraints that $0 \leq \phi_j \leq 1$ (i.e., $\phi_j \in \{0, 1\}$) and no two $\phi$'s can take on values that would imply that a given node were both a bend and a non-bend simultaneously. That is, if there is a constraint that a given node must have parallel segments on either side of it, then there cannot also be a constraint that the given node must represent a bend of a certain minimum angle. Otherwise there would be a geometric contradiction.

In formulating the general mixed-integer problem, it should be taken into account that when there are multiple bends "turned off" in a row, the correct minimum straight-segment length requirement to apply cannot be established by simply applying a minimum straight-segment length constraint to each segment. Rather, the contiguous set of collinear straight segments, comprising all those between, and at the ends of, the contiguous non-bends, must be considered to be a single "super-straight" segment.

Heretofore, the general mixed-integer problem has been discussed only in conjunction with the constraints. However, a similar process must be followed to account for the cost function's dependence on parameters associated with bends.

With such a formulation, a generic mixed-integer solver as known to those skilled in the art could be set to work on the problem. It would essentially try out many different combinations of bends and their placement relative to the constraints, by trying out many different settings of the $\phi$'s, subject to the constraints placed on them. At each setting of the $\phi$'s it would have a continuous sub-problem to solve, at least partially. As a result of this process, however, the generic mixed-integer solver, such as NOMAD, would in principle return the route that is most nearly optimal subject to the various constraints imposed upon the route and the overall cost function defined by the designer.

An additional improvement is to partition the routing for a transport element. Such a method may reduce the processing time for long transport elements. Generally the number of optimization variables, and therefore the time for processing continuous sub-problems, increases as a route length increases. Accordingly, if the route for a transport element is broken down into upstream and downstream sub-problems with weak interactions, the upstream and downstream portions for the route may be designed independently, and then those upstream and downstream routes may be used for a continuous sub-problem on the whole route to resolve the weak interactions between the upstream and downstream portions for the route. A partitioning method may be implemented, for example, by partitioning routes into sub-problems with lengths less than a predefined value. Another example implementation for a partitioning method may be to limit sub-problems for the route by a predefined maximum number of targets, such as where a sub-problem may include only, say, fifteen or fewer targets. Partitioning a route into sub-problems may be based, for example, on equal divisions of the whole route. For example, if a route includes twenty targets, two sub-problems may be formed each with ten targets, rather than having one sub-problem with the fifteen target maximum and the other sub-problem with only five targets. Once the partitioned sub-problems have been solved, they can be "stitched" together into an overall solution by simply concatenating them and using them as the starting point for a single continuous optimization. Since they will generally form a very good starting point, this continuous optimization can be very quick. The key principle is that the sum of the computational burdens of the partitioned sub-problems and the computational burden of the stitching-together process may be much less than the single computational burden of the original problem, because the computational burden of a given routing problem generally goes superlinearly with the number of nodes. Furthermore, the partitioned problems could be solved in parallel, given multiple computer processors.

It should be noted that the routing problem solved by the method and computer program product of the present invention cannot be formulated as an optimization in all continuous variables. In this regard, it may be thought that an overpopulation of nodes may be introduced with some of them vanishing as a natural consequence of a continuous optimization process. Thus some nodes might coalesce, to effectively reduce the number of bends in a certain region, or other nodes might take on a zero-degree bend, also to effectively reduce the number of bends. However, such an approach is impossible in any continuous context, because of the intrinsic constraints such as minimum bend angle (which forbids any bend from continuously passing from a finite angle to zero angle) and the minimum straight segment length constraint (which forbids any two nodes from coalescing). Thus, for at least some classes of curves, there is inherently an integer aspect to the problem, namely to choose the number of bends and their ordering relative to the constraint objects (both of which are described in only integer terms).

Oftentimes, it is desirable to route a new transport element parallel to or approximately parallel to an existing transport element. Various techniques can be employed in order to route a new transport element approximately parallel to an existing transport element.

According to one method for routing a new transport element proximate to an existing transport element, a space may be defined through which the route of the new transport element will extend based at least in part upon the route of the existing transport element. Typically the space is sized such that a plurality of candidate routes may extend therethrough with the method of the present invention permitting the selection of an optimal route from among the plurality of candidate routes. As shown in FIG. 26, the method of this embodiment typically defines a sleeve, such as an annular sleeve, about each segment of the existing transport element. In this regard, each annular sleeve generally defines an opening through which a segment of the existing transport element extends as well as an annular region surrounding the respective segment of the existing transport element through which a segment of the new transport element may extend. In the example depicted in FIG. 26, each annular sleeve has a radius of $r_1$ requiring that the new transport element stay away from the existing transport element by at least a distance $r_1$. Moreover, the outside radius of each sleeve is $r_2$, thereby requiring the new transport element to remain within a distance of $r_2$ from the existing transport element. However, the annular sleeve may be defined in a number of other fashions without departing from the spirit and scope of the present invention.

By extending through the spaces defined by the annular sleeves, the new transport element is roughly parallel to the existing transport element. Further, while FIG. 26 illustrates a single new transport element being routed roughly parallel to an existing transport element, an entire bundle of transport elements may be routed in a similar fashion, in sequence, if so desired. Thus, the method described above and depicted in FIG. 26 is advantageous since a new transport element may be routed in a manner that is roughly parallel to an existing transport element while permitting the new transport element to have a different number and arrangement of nodes. However, by not requiring the new transport element to be exactly parallel to the existing transport element, a more optimal route for the new transport element may be selected and greater freedom for the designer is retained.

Although the above methods related to subsequent transport element routing have been described in conjunction with the subsequent routing of a single transport element, the methods may route multiple transport elements simultaneously, as in a bundle. The multiple transport elements may be routed in various manners. For example, inter-transport element constraints may be defined to describe the desired relationships between the transport elements, as shown figuratively by the double headed arrows between adjacent transport elements in FIG. 27. It should be noted that the nodes of all of the transport elements are allowed to vary simultaneously, in contrast to the techniques described above in which an already existing transport element was frozen in place while another transport element was routed alongside. Alternatively, a meta-transport element may be routed which has a shape, a shown in FIG. 28, sufficient to contain a plurality of transport elements. The plurality of transport elements inside the meta-tube would bear a fixed, or partially fixed, spatial relationship to the meta-tube. In this regard, a cross-section of the meta-tube is analogous to a cross-section of the cylinder of a revolver gun, where the meta-tube is analogous to the revolver cylinder and where the spacing for actual tubes are analogous to the individual bullet chambers (inner-tubes) therein. That is, the meta-tube merely acts as a "guide" or "frame" for a bundle of tubes. In this regard, the meta-tube may be seen as merely implementing a particularly simple and rigid set of inter-tube constraints.

Further, when designing routes for multiple transport elements, several additional routing features may be employed. For example, when subsequently designing a route for a second transport element in the presence of an existing, first transport element, the existing transport element may be protected by stay-out zones. Similar to using annular sleeves for routing additional transport elements in proximity to an existing transport element, as shown in FIG. 26, parallel sleeve stay-out zones 124 may be used for protecting the existing transport element 120, such as to maintain a separation between the existing transport element 120 and any subsequent transport elements 122, as shown in FIG. 31. In the example of FIG. 26, each annular sleeve has an inner radius $r_1$ requiring that the new transport element stay away from the existing transport element by at least a distance $r_1$ and an outer radius $r_2$ requiring that the new transport element stay in proximity to the existing transport element at no greater than a distance $r_2$. By comparison, the parallel sleeves 124 shown in FIG. 31 are only stay-out zones through which subsequent transport elements are not permitted to pass, or preferably do not pass, thereby exhibiting similar properties as the inner radius $r_1$ restriction of the parallel sleeves in FIG. 26. Similarly, spherical stay-out zones 126 at nodes of the route for an existing transport element 120 may provide an adequate approximation of an existing transport element's shape and thus may be used for protecting the existing transport element 120, such as to maintain a separation between the existing transport element 120 and any subsequent transport elements 122, as shown in FIG. 32. In case there is a large number of spherical stay-out zones they might be organized in a hierarchical (e.g., bounding-box or bounding-sphere) tree, which is a classical technique for reducing the computational burden of distance calculations. Note that, while parallel stay-out sleeves 124, such as those described with reference to FIG. 31, may assist in designing a route for a subsequent transport element 132 in relation to an existing transport element 120 and protect the existing transport element, a parallel sleeve 124 does not per se have a preferred side. Thus, in practice, depending on the specific algorithmic characteristics of the underlying off-the-shelf optimizer being used (e.g., NPSOL), unintended spiraling or wrapping may occur when using parallel sleeves 124 for routing a subsequent transport element 132, as shown in FIG. 33. To prevent spiraling of a route for a subsequent transport element, a directional or spatial constraint may be imposed to control the positioning of the subsequent transport element with regard to the existing transport element. One solution may be to impose a simulation of gravity regularizer cost, such as directing a subsequent transport element to prefer a particular position with respect to the existing transport element as defined by a directional vector of a simulation of gravity regularizer cost. Another solution is to associate each parallel sleeve with a one-sided stay-out zone, such a parabolic sheet as described above, such as shown in FIGS. 14e, 15, and 16. thereby defining a stay-away direction for each parallel sleeve stay-out zone. For example, each parallel sleeve 124 may include a parabolic sheet stay-away zone 136 at the center of the sleeve, as shown in FIG. 34. Spiral routing may be avoided by using such a combination. A parallel sleeve may run parallel to and concentric to a straight-line portion of the route for the existing transport element. The parallel sleeve may have an associated parabolic sheet stay-away zone positioned at the longitudinal center of the associated parallel sleeve stay with the middle of the axis of the linear vertex of the parabolic sheet intersecting the centerline of the parallel sleeve stay-out zone. A parabolic-sheet stay-away zone or similar type of stay-away or stay-out constraint or cost may be used to effectively exclude half of all the space in the universe, cutting off a tube from being going on the "wrong" side of something. A parabolic sheet stay-away zone is merely one such type of constraint.

Another routing feature that may be employed when designing routes for multiple transport elements is a routing gutter. A routing gutter refers to a defined shape, such as shown in FIGS. 35 and 36, which defines a desired region in which to route a subsequent transport element in relation to an existing transport element. The principle of a routing gutter is both to define a region in which a subsequent transport element may be routed and remain parallel or at least quasi-parallel to the existing transport element and to define a preferred position for the subsequent transport element to prevent any unnecessary spiraling of the subsequent transport element. However, a routing gutter may be non-planar and include rotation about the existing transport element, such as to accommodate for overall rotational differences between the existing transport element and the subsequent transport element and/or to include spiraling as desired by a designer. A routing gutter 144 may be constructed, for example, as a partial circumferential sleeve 148 about an existing transport element 140 at a radius r with sides 146 extending tangentially away from the existing transport element 140 at the edges of the partial circumferential sleeve 148. The sides 146 of the routing gutter 144 may extend at a tangent from respective sides of the existing transport element 140 from r to a distance d, or possibly to infinity, and possibly with a preference for decreasing the distance between the existing transport element 140 and the subsequent transport element 142 to keep the subsequent transport element 142 within the routing gutter 144.

Another routing feature that may be employed when designing routes for multiple transport elements is bundle routing, i.e., routing bundles of transport elements. Currently, the only manner of routing multiple transport elements is to route transport elements sequentially, i.e., by routing a first transport element and then routing a subsequent, second transport element in relation to the existing, first transport element, where the existing transport element is considered fixed in space and typically serves as a stay-out zone for the subsequent transport element. This process can be repeated to route bundles of transport elements. However, subsequently routing a transport element in relation to an existing transport element which is fixed in space may not result in desirable positions for the multiple transport elements. For example, FIG. 37A shows a cross-section of a stay-out zone 164 and a first transport element 150. The stay-out zone 164 is non-symmetrical in shape and forms a trough 166 in which the first transport element 150 is routed. If it is preferred to route a transport element 150 towards the center of the trough 166, such as where the sides 168 of the trough 166 of the stay-out zone 164 have gradually receding force fields for the transport element 150 to avoid the side walls 168 of the trough 166 of the stay-out zone 164, the transport element 150 will likely be routed in the center of the trough 166, as shown in FIG. 37A. If a subsequent transport element 152 is routed in the trough 166 and in relation to the existing, fixed transport element 150, the subsequent transport element 152 may be routed as shown in FIG. 37B, where the second transport element 152 is positioned between the existing, fixed transport element 150 and a side wall 168 of the trough 166 of the stay-out zone 164. Routing the subsequent transport element 152 so close to a side wall 168 of the trough 166 of the stay-out zone 164 and the other transport element 150 may not be preferred. A configuration such as depicted in FIG. 37C may be preferred where the multiple transport elements 160, 162 are routed simultaneously to maintain symmetrical separation from side walls 168 of the trough 166 of the stay-away zone 164.

As described above, routing bundles of transport elements may be performed in either of two ways: (1) sequentially in time or (2) simultaneously. If bundle routing is performed sequentially, a new transport element is routed with respect to an existing transport element, or a set of existing transport elements, and these existing transport elements essentially play the role of background geometry—just like any other background geometry, i.e., the existing transport elements might be "marked-up" with, e.g., (a) detailed stay-out zones; (b) simplified stay-out zones, for reasons of computational speed, such as a sequence of spheres spaced out along the length of the existing transport element or transport elements, which serves to "protect" the existing transport element or transport elements with only a coarse fidelity, but from which is easy and fast to compute distances; (c) special constraint objects adapted to bundle routing, such as routing gutters (described above); or any number of other constraints. If bundle routing is performed simultaneously, instead of "building up" a bundle of transport elements one at a time, the transport elements can instead be routed all at once. This can be done either by first routing a "meta-tube" that is essentially a "guide" for a set of other transport elements, or by having the transport elements interact with one another during the optimization process. In both cases of bundle routing, all of the other constraints described herein (i.e., extrinsic constraints like hardpoints, adjustable hardpoints, stay-out zones, etc. and intrinsic constraints like minimum bend angle, minimum straight-section length, etc.) may be applied.

When routing bundles of transport elements, transport elements 170, 171, 172, 173 may share common node distributions, as shown in FIG. 38A, or transport elements 170, 171, 174, 175 may have different node distributions, as shown in FIG. 38B. In each of FIGS. 38A and 38B, the bundles show four tubes 170, 171, 172, 173 and 170, 171, 174, 175 routed through three targets 178. In FIG. 38A, each transport element 170, 171, 172, 173 has the same node distribution. In FIG. 38B, transport elements 174 and 175 have node distributions different from transport elements 171 and 172. The case presented in FIG. 38A will be sufficient for many applications, but the permutation presented in FIG. 38B may also be present in an embodiment of the present invention.

Rather than routing a subsequent transport element in relation to an existing transport element which is considered fixed in space, the routing of the multiple transport elements may interact. By interacting, the design of each transport element may influence and/or interfere with the design of other transport elements. Thus, the design of multiple transport elements may occur contemporaneously, such as where the design occurs simultaneously or near-simultaneously and where the design for routing one transport element interacts with the design for routing another transport element.

When routing multiple transport elements, one concern may be to avoid "braiding" amongst the multiple transport elements, i.e., to achieve anti-braiding of multiple transport elements. Braiding may occur because, from the point of view of an underlying mathematical optimization algorithm, a configuration in which one tube spirals around another (braiding) may be a local optimum, and, worse, a local optimum from which a non-braided (i.e., superior) local optimum is not reachable by a feasible path of configurations.

The method of the present invention is typically performed by a computer program product that interacts with a designer to provide the functionality described hereinabove. The computer program product for performing the optimized routing of a transport element generally includes a computer-readable storage medium, such as the non-volatile storage medium, and computer-readable program code portions, such as a series of computer instructions, embodied in the computer-readable storage medium. The computer-readable storage medium is generally accessible by a processing element, such as a computer, workstation or the like, for executing the foregoing method in an automated fashion. Thus, based upon some input provided by the designer such as the constraint objects, the identification of the overall cost function, the NTE and preferred values for various parameters, the high and low values for various parameters, the weighting of different cost violations and the like, the computer program product will then operate in accordance with the method of the present invention to determine an optimal route.

The method described above can therefore be implemented by computer program instructions. These computer program instructions may be loaded onto a computer or other programmable apparatus to produce a machine, such that the instructions which execute on the computer or other programmable apparatus create means for implementing the various functions of the method. These computer program instructions may also be stored in a computer-readable memory that can direct a computer or other programmable apparatus to function in a particular manner, such that the instructions stored in the computer-readable memory produce an article of manufacture including instruction means which implement the various functions of the method. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the various functions of the method.

As described above, the computer program product is preferably adapted to solve a mixed-integer nonlinear optimization problem. The problem could in principle be formulated in its full mixed-integer generality, and an off-the-shelf mixed-integer solver such as NOMAD could be utilized. In one embodiment, however, the method exploits specialized domain knowledge to generate a highly promising subset of points in the integer subspace, in a very efficient order, as described, e.g., by the easy-pass/forward-pass/backward-pass procedure above.

Targets, Section Constraints, and Constraint Relationships

Each continuous sub-problem corresponds to a particular number and placement of bends, that is, a choice of (a) how many bends there are, and (b) where the bends fall with respect to the constraint objects and, more precisely, with respect to the targets. In this regard, one class of constraint objects is targets. A target has the property that it necessarily exerts an influence on a predetermined number of nodes in the transport element. That is, the constraint formulas behind a target involve a predictable number of nodes. For example, a hardpoint sets up low-level mathematical constraints that involve precisely four nodes. Another property of targets is that the transport element can meaningfully be said to go through them.

Another class of constraint objects is section constraints, which are different from targets in that the number of nodes they influence or constrain depends on the particular problem in which they are used. The reason they are called section constraints is that they apply to a section, the portion of a transport element lying between two targets. For example, a stay-out zone may apply to the section consisting of the A-end, the B-end, and everything in between, i.e. the entire transport element. Because the node distribution is yet to be determined, it is therefore impossible to tell, a priori, the number of nodes contained in the section. Instead, the problem must be solved to determine the number of nodes. But however many there are, the stay-out zone interacts with every node and link between the A-end and the B-end. If there was a hardpoint between the A-end and B-end, however, the same stay-out zone could have been specified to apply to the section consisting in the A-end, the hardpoint, and everything in between. The stay-out zone would not exert an influence on any nodes between the hardpoint and the B-end. It should be noted that a stay-out zone, or any other section constraint, has a distinct identity independent of what section of the transport element to which it is applied, such that the same data structure can be re-used on different sections, or even different transport elements.

Finally, constraint relationships are meta-constraints that apply to conditions existing at any set of targets. Usually the set is just a pair. Larger sets can be obtained either explicitly or de facto by chaining pairs together. In addition, constraint relationships may exist even between section constraints, not just between targets. For example, a constraint relationship may fix the slope in two different sections of the transport element to be identical, or identical to within certain limits, without specifying the slope in either section.

For each inter-target gap, a concrete number of bends must be assigned, and each distinct assignment leads to a new continuous sub-problem, which consists in adjusting the node locations until the overall cost function appears to be minimized.

It is illuminating to estimate the size of the integer space. If there are $N_t$ targets, then there are $N_t-1$ inter-target gaps. Assuming zero to three bends in any gap, then there are potentially $4^{N_t-1}$ points in the integer subspace to consider. Thus a 7-target problem implies 4096 continuous sub-problems. Rather than visiting all 4096 integer sites in the discrete parameter space, the method of the present invention instead visits a heuristically limited subset of them, typically a few dozen at most. Furthermore, these sites are advantageously visited in a particularly promising order, via the forward and backward passes.

At any rate, each continuous sub-problem has a complicated cost function and a complicated set of constraints. "Complicated" does not necessarily mean that variables or constraints are particularly numerous. In fact, by continuous optimization standards, they are rather few, on the order of dozens, or at most hundreds. It does mean, however, that the cost function and constraints depend in a complicated way on the constraint objects which are set up by the designer in generally unpredictable ways, and generally in an interactive setting.

The constraint objects are essentially "bundles" or "packages" of many very simple constraints that may be processed by commercial or otherwise off-the-shelf optimization programs such as NPSOL. The designer can pick and choose as many of these packages as they like, and lay them out in a 3-D environment. However, without computer assistance, to proceed from such a layout to a single complete, correct continuous sub-problem, described directly in terms acceptable by off-the-shelf optimization programs would be so error-prone and time consuming as to be utterly impractical.

That being said, the method of one advantageous embodiment performs two subtasks:

1. Transcription.

Given an abstract description of a single continuous sub-problem, i.e., given a choice of how many nodal points there are, and where they fall relative to the constraint objects, the method constructs an appropriate cost function, a constraint function vector, the constraint bounds, scale factors, and other arguments, to pass to a commercial or otherwise off-the-shelf optimization program, which typically expects its inputs in this new form.

2. Flexible Manipulation of a Family of Sub-Problems.

The computer program product also makes it possible to formulate the myriad continuous sub-problems that must be formulated and solved to account for the integer portion of the problem space.

To avoid circumstances where a method of the present invention may be incapable of designing a feasible route for a transport element, a method of the present invention may employ constraint relaxation, whereby at least one constraint is relaxed according to the soft-only mode for relaxing a constraint describe above, where, in fact, the constraint is replaced or ignored and only an associated cost function is employed. If all of the constraints for a route design are relaxed in this way, the route design becomes feasible by definition in that the design becomes an unconstrained optimization. By relaxing constraints, at least some feasible route may be designed and presented to a user, rather than, for example, merely issuing an error message stating "no feasible route configuration." For example, FIG. 39 shows a transport element 180 emanating from an A-end 181 with a minimum standoff min standoff 182 and minimum bend angle 184 of 90 degrees. With these constraint objects, a route that circumvents the circular stay-out zone 196 of radius r 197 is infeasible. The infeasibility, or feasibility-failure, is indicated in FIG. 39 by the large X 190. Such indications of infeasibility may help the user to judge how much the various constraints such as the minimum standoff 182, maximum bend angle 184, and stay-out radius 197 contribute to the infeasibility, and thereby possibly determine how to adjust the underlying constraints to permit the design of a feasible route. Another method of indicating an infeasibility is to highlight, for example, with varying colors and/or intensities of brightness, the constraints relaxed to permit the feasible route, thereby focusing the attention of a user on those constraints associated with the infeasibility. In the example route shown in FIG. 39, the minimum standoff 182 from the A-end 181, maximum bend angle 184, and stay-out radius 197 could be highlighted graphically.

Consider also, for example, the case of minimizing the length of a transport element in the face of minimum bend angle constraints, as described with respect to FIGS. 40A, 40B, and 40C. Suppose that there were obstacles, such as stay-out zones, in the way that prevented a permissible route from being found which would not violate any constraints, i.e., there is no feasible route. It may be unclear whether the obstacles are "at fault" or the minimum bend-angles are "at fault." A method of an embodiment of the present invention could convert the minimum-bend-angle constraints into one or more cost functions related to achieving the minimum-bend-angle constraint, thereby converting the infeasible route with constraints into a feasible route with cost functions. That is, a method could delete the minimum-bend-angle constraints (the rules $\theta_1 \geq \theta_0$ and $\theta_2 \geq \theta_0$) and add the cost functions $C_{\theta 1}$ and $C_{\theta 2}$. (Alternatively, if those cost functions were already being used, the method could simply delete the constraints, i.e., use the "soft-only" enforcement mode.)

While relaxing a single constraint, or a limited number of constraints, may transform an infeasible design into a feasible design, it is not always possible to trace infeasibility to specific constraints, such as tracing failure of feasibility to a single constraint. However, relaxing less than all constraints for a design may transform an infeasible design into a feasible design. Accordingly, constraint relaxation may relax as few as one constraint to as many as all constraints for a route design. For example, one method may relax a number of constraints closest to a suspected infeasibility, such as to relax all constraints within the nearest two targets of the suspected infeasibility or all constraints within the nearest two upstream and nearest two downstream targets of the suspected infeasibility.

By relaxing constraints, the resulting feasible route may have minimal distortion from the desired route for a transport element. However, to assist a user in evaluating the infeasibility of a route, a method may output, typically graphically, the degree to which a relaxed constraint bound, i.e., the not-to-exceed (NTE) value of the unrelaxed constraint, has been exceeded. Displaying the degree of deviation may be performed, for example, by highlighting portions of the feasible route with varying colors and/or intensities of brightness. For example, color ranges could be assigned to ranges of percentage deviation from parameter values that surpass what would have been do-not-exceed values of constraints had the constraints not been relaxed, such as where blue indicates no violation, and yellow, orange, and red represent increasing ranges of percentage deviation.

Regardless of the particular implementation, the various embodiments of the method of the present invention permit the route of a transport element to be automatically defined in accordance with one or more constraints that drive or guide the design. As such, the constraints are taken into account during the design of the route and do not merely serve as post hoc checks, wherein the discovery of any violations would require the route to be redesigned. Additionally, the method for designing the route of a transport element establishes an overall cost function to permit the route that is automatically defined to be optimal relative to the overall cost function. By establishing different types of overall cost function, different routes may be defined based upon the requirements of a particular application. Additional embodiments of the present invention further improve the method by permitting relationships to be established between two or more of the constraints and permitting the route to be automatically defined while maintaining the other constraints. Additionally, the route of the transport element may be based upon and proximate to an already existing transport element, if desired, or it may be applied to multiple transport elements simultaneously to route bundles. Additional embodiments rely upon an additional constraint or cost function component to design a route for a transport element.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. In this regard, the method of the present invention has been primarily described in conjunction with the routing of tubes. However, the method is also applicable to the routing of other transport elements such as cables, hoses, wires, wire bundles and the like. In addition, while the routes described heretofore have primarily consisted of straight segments connected by circular arcs, the method of the present invention may construct routes having other shapes, such as routes following a B-spline curve or the like. Although specific terms are employed herein, they are used in a generic and descriptive sense only and not for purposes of limitation.

What is claimed is:

1. A method of designing a route for a second transport element at least partially based upon a route for a first transport element, the method comprising:
    establishing at least one constraint that limits possible routes for the second transport element, wherein establishing the at least one constraint comprises establishing at least one inequality constraint which limits the possible routes for the second transport element without fixing a position of any portion of the second transport element, wherein establishing the at least one constraint further comprises establishing the at least one constraint based upon the route for the first transport element;
    establishing an overall cost function for evaluating the possible routes for the second transport element, wherein establishing the overall cost function comprises defining a preferred value for the at last one constraint and a cost for variances from the preferred value for the at last one constraint, and wherein establishing the overall cost function comprises incorporating the cost of variances for the at last one constraint in the overall cost function; and
    automatically defining, using a processor, the route for the second transport element in accordance with the at least one constraint and pursuant to the overall cost function, wherein automatically defining the route for the second transport element comprises defining the route for the second transport element to include straight segments that are non-orthogonal relative to one another.

2. A method according to claim 1, wherein at least a portion of the route for the first transport element is designed prior to the design of the route for the second transport element, thereby the route for the first transport element defines a route for an existing transport element.

3. A method according to claim 2, wherein a plurality of nodes defines the route for the first transport element, and wherein establishing the at least one constraint further comprises establishing spherical stay-out zones at the nodes of the route for the first transport element.

4. A method according to claim 3, wherein establishing the at least one constraint further comprises establishing at least two sleeves surrounding portions of the route for the first transport element, wherein a spherical stay-out zone is positioned at a node between the two sleeves.

5. A method according to claim 2, wherein establishing the at least one constraint further comprises establishing at least one sleeve surrounding at least a portion of the route for the first transport element.

6. A method according to claim 5, wherein at least one sleeve has an associated stay-out zone defining a stay-away direction.

7. A method according to claim 6, wherein establishing the at least one sleeve surrounding at least a portion of the route for the first transport element further comprises establishing at least one stay-in sleeve that is parallel and concentric to a straight-line portion of the route for the first transport element, and wherein at least one stay-out zone comprises a parabolic sheet positioned at a longitudinal centerline of its associated stay-out sleeve, wherein a middle of an axis of a linear vertex of the parabolic sheet intersects the centerline of its associated stay-out sleeve.

8. A method according to claim 5, wherein establishing at least one sleeve surrounding at least a portion of the route for the first transport element further comprises establishing at least one stay-out sleeve that is parallel and concentric to a straight-line portion of the route for the first transport element.

9. A method according to claim 8, wherein at least one stay-out zone comprises a parabolic sheet positioned at a longitudinal centerline of its associated stay-out sleeve, wherein a middle of an axis of a linear vertex of the parabolic sheet intersects a side of its associated stay-out sleeve.

10. A method according to claim 2, wherein establishing the at least one constraint further comprises establishing a routing gutter providing a stand-off from the first transport element and configured for defining the route for the second transport element quasi-parallel to the route for the first transport element.

11. A method according to claim 10, wherein establishing the routing gutter defines a shape with a partial circumferential sleeve about the first transport element and sides commencing at longitudinal edges of the partial circumferential sleeve and extending away from the first transport element.

12. A method according to claim 1, further comprising the step of automatically defining at least a portion of the route for the first transport element contemporaneous with the step of automatically defining the route for the second transport element.

13. A method according to claim 12, further comprising defining a route for a meta-tube through which the routes for at least the first and second transport elements pass, and wherein establishing the at least one constraint further comprises establishing at least one multiple transport element cross-sectional arrangement constraint within the meta-tube for preventing braiding of the routes for transport elements which pass through the meta-tube.

14. A method according to claim 1, wherein establishing the at least one constraint further comprises establishing at least one constraint based upon background structure.

15. A method according to claim 1, wherein establishing the at least one constraint comprises establishing at least one constraint selected by a designer and independent of background structure.

16. A method according to claim 1, wherein establishing the at least one constraint further comprises establishing at least one intrinsic constraint dependent upon the second transport element itself and independent of background structure.

17. A method according to claim 1, wherein establishing the overall cost function comprises defining the overall cost function pursuant to at least one predefined design characteristic.

18. A method according to claim 1, wherein automatically defining the route comprises automatically defining a plurality of nodes along the route.

19. A method according to claim 1, wherein establishing the at least one constraint further comprises establishing at least one hardpoint constraint defining a location of a hardpoint through which the second transport element must pass.

20. A method according to claim 19, wherein establishing the at least one hardpoint constraint comprises establishing at least one adjustable hardpoint constraint defining a region within which a hardpoint is located and through which the second transport element must pass.

21. A method according to claim 20, wherein automatically defining the route comprises automatically defining the location of the hardpoint within the at least one adjustable hardpoint constraint.

22. A method of designing a route for a transport element comprising:
    establishing at least one constraint that limits possible routes for the transport element, wherein establishing the at least one constraint comprises establishing at least one inequality constraint which limits the possible routes for the transport element without fixing a position of any portion of the transport element, wherein establishing the at least one constraint further comprises establishing at least one additional constraint selected from a group of an additional constraint and a cost function;
    establishing an overall cost function for evaluating the possible routes for the transport element, wherein establishing the overall cost function comprises defining a preferred value for at last one constraint and a cost for variances from the preferred value for at last one constraint, and wherein establishing the overall cost function comprises incorporating the cost of variances for at last one constraint in the overall cost function; and
    automatically defining, using a processor, the route for the transport element in accordance with the at least one constraint and pursuant to the overall cost function, wherein automatically defining the route comprises defining the route for the transport element to include straight segments that are non-orthogonal relative to one another.

23. A method according to claim 22, wherein establishing the at least one additional constraint comprises establishing at least one of an upper number-of-nodes limit and a lower number-of-nodes limit.

24. A method according to claim 23, wherein establishing the at least one of an upper number-of nodes limit and a lower number-of nodes limit comprises setting a limit on how many nodes should be positioned between any two adjacent targets.

25. A method according to claim 23, wherein the at least one of an upper number-of-nodes limit and a lower number-of nodes limit relates to a number of nodes from a previous routing solution.

26. A method according to claim 22, wherein establishing the at least one additional constraint comprises partitioning possible routes for the transport element.

27. A method according to claim 26, wherein the partitioning possible routes for the transport element comprises limiting a length of a portion of the route.

28. A method according to claim 26, wherein the partitioning possible routes for the transport element comprises limiting a number of targets in a portion of the route.

29. A method according to claim 22, wherein establishing the at least one additional constraint comprises establishing a simulation-of-gravity constraint that establishes a directional propensity for the route for the transport element.

30. A method according to claim 29, wherein establishing the simulation-of-gravity constraint comprises positioning a simulation-of-gravity directional icon.

31. A method according to claim 22, wherein establishing the at least one additional constraint comprises establishing a segment-length-based constraint.

32. method according to claim 31, wherein establishing the segment-length-based constraint comprises imposing a preference for equal segment lengths.

33. A method according to claim 31, wherein establishing the segment-length-based constraint comprises imposing a preference for reducing a sum of squares of segment lengths.

34. A method according to claim 22, wherein establishing the at least one additional constraint comprises establishing a planarity constraint for at least a portion of the route for the transport element.

35. A method according to claim 34, wherein establishing the planarity constraint for at least a portion of the route for the transport element comprises establishing an equality constraint for normalized vectors that form axes of nodes in the portion of the route subject to the planarity constraint.

36. A method of designing a route for a transport element between a pair of endpoints comprising:
    establishing a first constraint that limits possible routes for the transport element;
    determining, using a processor, that defining a route for the transport element satisfying the first constraint is infeasible;
    relaxing the first constraint, whereby the first constraint is replaced by a cost function, thereby defining a first cost function;
    automatically defining, using the processor, the route for the transport element in accordance with the first cost function; and
    providing, using the processor, an indication for the route of a variance between the first constraint and the first cost function of the automatically defined route.

37. A method according to claim 36, wherein relaxing the first constraint comprises relaxing all constraints to be replaced by cost functions, and providing an indication for the route of the variance between the first constraint and the first cost function of the automatically defined route comprises providing an indication for the route of the variances between all of the constraints and all of the corresponding cost functions of the automatically defined route.

38. A method according to claim 36, wherein the step of providing an indication for the route of the variance between the first constraint and the first cost function of the automatically defined route comprises visually displaying the variance between the first constraint and the first cost function of the automatically defined route.

39. A method according to claim 38, wherein the step of visually displaying the variance between the first constraint and the first cost function of the automatically defined route comprises visually displaying the magnitude of variance between the first constraint and the first cost function of the automatically defined route.

40. A method of designing a route for a second transport element at least partially based upon the route for a first transport element, the method comprising:

establishing at least one constraint that limits possible routes for the second transport element, wherein establishing the at least one constraint comprises establishing at least one inequality constraint which limits the possible routes for the second transport element without fixing a position of any portion of the second transport element, wherein establishing the at least one constraint further comprises establishing at least one constraint based upon the route for the first transport element, wherein establishing the at least one constraint further comprises establishing at least one hardpoint constraint defining a location of a hardpoint through which the transport element must pass, and wherein establishing at least one hardpoint constraint comprises establishing at least one adjustable hardpoint constraint defining a region within which a hardpoint is located and through which the second transport element must pass;

establishing an overall cost function for evaluating the possible routes for the second transport element; and automatically defining, using a processor, the route for the second transport element in accordance with the at least one constraint and pursuant to the overall cost function.

41. A method according to claim 40, wherein automatically defining the route for the second transport element comprises automatically defining the location of the hardpoint within the at least one adjustable hardpoint constraint.

42. A method of designing a route for a second transport element comprising:

establishing at least one constraint that limits possible routes for the second transport element, wherein establishing the at least one constraint comprises establishing at least one inequality constraint which limits the possible routes for the second transport element without fixing a position of any portion of the transport element and establishing a simulation-of-gravity constraint that establishes a directional propensity of the route for the second transport element;

establishing an overall cost function for evaluating the possible routes for the second transport element; and automatically defining, using a processor, the route for the second transport element in accordance with the at least one constraint and pursuant to the overall cost function.

43. A method according to claim 42, wherein establishing the simulation-of-gravity constraint comprises positioning a simulation-of gravity directional icon.

44. A method according to claim 42, further comprising establishing at least one additional constraint comprising at least one of an upper number-of-nodes limit and a lower number-of-nodes limit.

45. A method according to claim 42, further comprising establishing at least one additional constraint imposing a preference for equal segment lengths for the route for the second transport element.

* * * * *

UNITED STATES PATENT AND TRADEMARK OFFICE
CERTIFICATE OF CORRECTION

PATENT NO. : 7,647,211 B2
APPLICATION NO. : 11/439643
DATED : January 12, 2010
INVENTOR(S) : Michael Drumheller It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 855 days.

Signed and Sealed this

Sixteenth Day of November, 2010

David J. Kappos
*Director of the United States Patent and Trademark Office*